US012731115B2

(12) United States Patent
Ilincic et al.

(10) Patent No.: US 12,731,115 B2
(45) Date of Patent: Sep. 8, 2026

(54) SYSTEMS AND METHODS FOR TRANSACTION PROCESSING BASED ON AUTHENTICATED IDENTITY

(71) Applicant: Capital One Services, LLC, McLean, VA (US)

(72) Inventors: Rajko Ilincic, Annandale, VA (US); Jeffrey Rule, Brooklyn, NY (US)

(73) Assignee: Capital One Services, LLC, McLean, VA (US)

(*) Notice: Subject to any disclaimer, the term of this patent is extended or adjusted under 35 U.S.C. 154(b) by 102 days.

(21) Appl. No.: 18/209,321

(22) Filed: Jun. 13, 2023

(65) Prior Publication Data

US 2024/0420100 A1 Dec. 19, 2024

(51) Int. Cl.
*G06Q 20/08* (2012.01)
*G06Q 10/02* (2012.01)
*G06Q 20/34* (2012.01)

(52) U.S. Cl.
CPC .......... *G06Q 20/085* (2013.01); *G06Q 10/02* (2013.01); *G06Q 20/351* (2013.01)

(58) Field of Classification Search
None
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,590,038 A * | 12/1996 | Pitroda | G06Q 20/4093 705/41 |
| 5,592,553 A | 1/1997 | Guski et al. | |
| 5,616,901 A | 4/1997 | Crandall | |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Neha Patel
*Assistant Examiner* — Jahed Ali
(74) *Attorney, Agent, or Firm* — KDW Firm PLLC; Andrew D. Kasnevich

(57) ABSTRACT

The present embodiments disclose a system and method for dynamically generating a reservation and performing a checkout request. The system includes a user device application and a server. The method proceeds with making a reservation request, providing login information, making a check-in request, and again providing login information. Additionally, the method proceeds with checkout without the need for a waitstaff member to retrieve the customer's card.

19 Claims, 9 Drawing Sheets

System 100

(56) References Cited

U.S. PATENT DOCUMENTS

| | | | |
|---|---|---|---|
| 5,666,415 A | 9/1997 | Kaufman | |
| 5,764,789 A | 6/1998 | Pare, Jr. et al. | |
| 5,768,373 A | 6/1998 | Lohstroh et al. | |
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,929,413 A | 7/1999 | Gardner | |
| 5,960,411 A | 9/1999 | Hartman et al. | |
| 6,021,203 A | 2/2000 | Douceur et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,572,015 B1 * | 6/2003 | Norton | B60R 25/04 235/382 |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,731,778 B1 | 5/2004 | Oda et al. | |
| 6,779,115 B1 | 8/2004 | Naim | |
| 6,792,533 B2 | 9/2004 | Jablon | |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,252,242 B2 * | 8/2007 | Ho | G06K 19/07745 235/487 |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,527,208 B2 * | 5/2009 | Hammad | G06Q 20/341 235/382 |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Holtmanns et al. | |
| 7,652,578 B2 | 1/2010 | Braun et al. | |
| 7,689,832 B2 | 3/2010 | Talmor et al. | |
| 7,703,142 B1 | 4/2010 | Wilson et al. | |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,900,048 B2 | 3/2011 | Andersson | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,993,197 B2 | 8/2011 | Mamdani et al. | |
| 8,005,426 B2 | 8/2011 | Huomo et al. | |
| 8,010,405 B1 | 8/2011 | Bortolin et al. | |
| RE42,762 E | 9/2011 | Shin | |
| 8,041,954 B2 | 10/2011 | Plesman | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,103,249 B2 | 1/2012 | Markison | |
| 8,108,687 B2 | 1/2012 | Ellis et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,196,131 B1 | 6/2012 | von Behren et al. | |
| 8,215,563 B2 | 7/2012 | Levy et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,245,292 B2 | 8/2012 | Buer | |
| 8,249,654 B1 | 8/2012 | Zhu | |
| 8,266,451 B2 | 9/2012 | Leydier et al. | |
| 8,276,814 B1 * | 10/2012 | Davis | G06Q 20/352 235/487 |
| 8,285,329 B1 | 10/2012 | Zhu | |
| 8,302,872 B2 | 11/2012 | Mullen | |
| 8,312,519 B1 | 11/2012 | Bailey et al. | |
| 8,316,237 B1 | 11/2012 | Felsher et al. | |
| 8,332,272 B2 | 12/2012 | Fisher | |
| 8,346,670 B2 * | 1/2013 | Hasson | G06Q 20/352 235/382 |
| 8,365,988 B1 | 2/2013 | Medina, III et al. | |
| 8,369,960 B2 | 2/2013 | Tran et al. | |
| 8,371,501 B1 | 2/2013 | Hopkins | |
| 8,381,307 B2 | 2/2013 | Cimino | |
| 8,391,719 B2 | 3/2013 | Alameh et al. | |
| 8,417,231 B2 | 4/2013 | Sanding et al. | |
| 8,439,271 B2 | 5/2013 | Smets et al. | |

(56) References Cited

U.S. PATENT DOCUMENTS

| | | | | |
|---|---|---|---|---|
| 8,475,367 | B1 | 7/2013 | Yuen et al. | |
| 8,489,112 | B2 | 7/2013 | Roeding et al. | |
| 8,511,542 | B2 | 8/2013 | Pan | |
| 8,511,547 | B2 * | 8/2013 | Rans | G06Q 20/40 235/492 |
| 8,519,822 | B2 * | 8/2013 | Riegebauer | G07F 7/1008 340/5.4 |
| 8,559,872 | B2 | 10/2013 | Butler | |
| 8,566,916 | B1 | 10/2013 | Vernon et al. | |
| 8,567,670 | B2 | 10/2013 | Stanfield et al. | |
| 8,572,386 | B2 | 10/2013 | Takekawa et al. | |
| 8,577,810 | B1 | 11/2013 | Dalit et al. | |
| 8,583,454 | B2 | 11/2013 | Beraja et al. | |
| 8,589,335 | B2 | 11/2013 | Smith et al. | |
| 8,594,730 | B2 | 11/2013 | Bona et al. | |
| 8,615,468 | B2 | 12/2013 | Varadarajan | |
| 8,620,218 | B2 | 12/2013 | Awad | |
| 8,667,285 | B2 | 3/2014 | Coulier et al. | |
| 8,723,941 | B1 | 5/2014 | Shirbabadi et al. | |
| 8,726,405 | B1 | 5/2014 | Bailey et al. | |
| 8,740,073 | B2 | 6/2014 | Vijayshankar et al. | |
| 8,750,514 | B2 | 6/2014 | Gallo et al. | |
| 8,752,189 | B2 | 6/2014 | De Jong | |
| 8,794,509 | B2 | 8/2014 | Bishop et al. | |
| 8,799,668 | B2 | 8/2014 | Cheng | |
| 8,806,592 | B2 | 8/2014 | Ganesan | |
| 8,807,440 | B1 | 8/2014 | Von Behren et al. | |
| 8,811,892 | B2 | 8/2014 | Khan et al. | |
| 8,814,039 | B2 | 8/2014 | Bishop et al. | |
| 8,814,052 | B2 | 8/2014 | Bona et al. | |
| 8,818,867 | B2 | 8/2014 | Baldwin et al. | |
| 8,850,538 | B1 | 9/2014 | Vernon et al. | |
| 8,861,733 | B2 | 10/2014 | Benteo et al. | |
| 8,870,081 | B2 * | 10/2014 | Olson | G06Q 20/3415 235/487 |
| 8,880,027 | B1 | 11/2014 | Darringer | |
| 8,888,002 | B2 | 11/2014 | Chesney et al. | |
| 8,898,088 | B2 | 11/2014 | Springer et al. | |
| 8,934,837 | B2 | 1/2015 | Zhu et al. | |
| 8,977,569 | B2 | 3/2015 | Rao | |
| 8,994,498 | B2 | 3/2015 | Agrafioti et al. | |
| 9,004,365 | B2 | 4/2015 | Bona et al. | |
| 9,038,893 | B2 * | 5/2015 | Kirkham | G07F 17/0042 235/492 |
| 9,038,894 | B2 | 5/2015 | Khalid | |
| 9,042,814 | B2 | 5/2015 | Royston et al. | |
| 9,047,531 | B2 | 6/2015 | Showering et al. | |
| 9,069,976 | B2 | 6/2015 | Toole et al. | |
| 9,081,948 | B2 | 7/2015 | Magne | |
| 9,104,853 | B2 | 8/2015 | Venkataramani et al. | |
| 9,118,663 | B1 | 8/2015 | Bailey et al. | |
| 9,122,964 | B2 | 9/2015 | Krawczewicz | |
| 9,129,199 | B2 | 9/2015 | Spodak | |
| 9,129,280 | B2 | 9/2015 | Bona et al. | |
| 9,152,832 | B2 | 10/2015 | Royston et al. | |
| 9,183,490 | B2 * | 11/2015 | Moreton | H04B 5/24 |
| 9,203,800 | B2 | 12/2015 | Izu et al. | |
| 9,209,867 | B2 | 12/2015 | Royston | |
| 9,251,330 | B2 | 2/2016 | Boivie et al. | |
| 9,251,518 | B2 | 2/2016 | Levin et al. | |
| 9,258,715 | B2 | 2/2016 | Borghei | |
| 9,270,337 | B2 | 2/2016 | Zhu et al. | |
| 9,275,325 | B2 * | 3/2016 | Newcombe | G06K 19/06037 |
| 9,286,606 | B2 * | 3/2016 | Diamond | G06Q 20/347 |
| 9,306,626 | B2 | 4/2016 | Hall et al. | |
| 9,306,753 | B1 * | 4/2016 | Vandervort | H04L 9/3234 |
| 9,306,942 | B1 | 4/2016 | Bailey et al. | |
| 9,324,066 | B2 | 4/2016 | Archer et al. | |
| 9,324,067 | B2 | 4/2016 | Van Os et al. | |
| 9,332,587 | B2 | 5/2016 | Salahshoor | |
| 9,338,622 | B2 | 5/2016 | Bjontegard | |
| 9,373,141 | B1 | 6/2016 | Shakkarwar | |
| 9,379,841 | B2 | 6/2016 | Fine et al. | |
| 9,413,430 | B2 | 8/2016 | Royston et al. | |
| 9,413,768 | B1 | 8/2016 | Gregg et al. | |
| 9,420,496 | B1 | 8/2016 | Indurkar | |
| 9,426,132 | B1 | 8/2016 | Alikhani | |
| 9,432,339 | B1 | 8/2016 | Bowness | |
| 9,455,968 | B1 | 9/2016 | Machani et al. | |
| 9,473,509 | B2 | 10/2016 | Arsanjani et al. | |
| 9,491,626 | B2 | 11/2016 | Sharma et al. | |
| 9,501,776 | B2 * | 11/2016 | Martin | H04W 12/06 |
| 9,552,579 | B2 * | 1/2017 | Griffin | G06Q 20/108 |
| 9,553,637 | B2 | 1/2017 | Yang et al. | |
| 9,619,952 | B1 | 4/2017 | Zhao et al. | |
| 9,635,000 | B1 | 4/2017 | Muftic | |
| 9,665,858 | B1 | 5/2017 | Kumar | |
| 9,674,705 | B2 | 6/2017 | Rose et al. | |
| 9,679,286 | B2 | 6/2017 | Colnot et al. | |
| 9,680,942 | B2 | 6/2017 | Dimmick | |
| 9,710,744 | B2 * | 7/2017 | Wurmfeld | G06K 19/07722 |
| 9,710,804 | B2 | 7/2017 | Zhou et al. | |
| 9,740,342 | B2 | 8/2017 | Paulsen et al. | |
| 9,740,988 | B1 | 8/2017 | Levin et al. | |
| 9,763,097 | B2 | 9/2017 | Robinson et al. | |
| 9,767,329 | B2 | 9/2017 | Forster | |
| 9,769,662 | B1 | 9/2017 | Queru | |
| 9,773,151 | B2 | 9/2017 | Mil'shtein et al. | |
| 9,780,953 | B2 | 10/2017 | Gaddam et al. | |
| 9,891,823 | B2 | 2/2018 | Feng et al. | |
| 9,940,571 | B1 | 4/2018 | Herrington | |
| 9,949,065 | B1 * | 4/2018 | Zarakas | H04L 63/0876 |
| 9,953,323 | B2 | 4/2018 | Candelore et al. | |
| 9,961,194 | B1 | 5/2018 | Wiechman et al. | |
| 9,965,632 | B2 * | 5/2018 | Zarakas | G06F 21/77 |
| 9,965,756 | B2 | 5/2018 | Davis et al. | |
| 9,965,911 | B2 | 5/2018 | Wishne | |
| 9,977,890 | B2 * | 5/2018 | Alberti | H04L 63/101 |
| 9,978,056 | B2 * | 5/2018 | Seo | G06Q 20/3572 |
| 9,978,058 | B2 | 5/2018 | Wurmfeld et al. | |
| 9,990,795 | B2 * | 6/2018 | Wurmfeld | G06K 19/0772 |
| 10,007,873 | B2 * | 6/2018 | Heo | G06Q 20/322 |
| 10,013,693 | B2 * | 7/2018 | Wyatt | G06Q 20/409 |
| 10,043,164 | B2 | 8/2018 | Dogin et al. | |
| 10,075,437 | B1 | 9/2018 | Costigan et al. | |
| 10,121,130 | B2 * | 11/2018 | Pinski | G06Q 20/12 |
| 10,129,648 | B1 | 11/2018 | Hernandez et al. | |
| 10,133,979 | B1 | 11/2018 | Eidam et al. | |
| 10,210,505 | B2 * | 2/2019 | Zarakas | G06Q 20/352 |
| 10,217,105 | B1 | 2/2019 | Sangi et al. | |
| 10,242,368 | B1 * | 3/2019 | Poole | G06Q 20/405 |
| 10,296,910 | B1 * | 5/2019 | Templeton | G06Q 20/4014 |
| 10,332,102 | B2 * | 6/2019 | Zarakas | G06Q 20/3829 |
| 10,360,557 | B2 * | 7/2019 | Locke | G06K 19/07733 |
| 10,380,471 | B2 * | 8/2019 | Locke | G06K 19/0704 |
| 10,395,244 | B1 * | 8/2019 | Mossler | G06Q 20/3226 |
| 10,453,054 | B2 * | 10/2019 | Zarakas | G06Q 20/385 |
| 10,474,941 | B2 * | 11/2019 | Wurmfeld | G06K 19/07722 |
| 10,475,027 | B2 * | 11/2019 | Guise | G06Q 20/4012 |
| 10,482,453 | B2 * | 11/2019 | Zarakas | G06Q 20/321 |
| 10,482,457 | B2 * | 11/2019 | Poole | G06Q 20/40 |
| 10,489,774 | B2 * | 11/2019 | Zarakas | G06Q 20/4016 |
| 10,489,781 | B1 * | 11/2019 | Osborn | H04L 9/0866 |
| 10,510,070 | B2 * | 12/2019 | Wurmfeld | G06Q 20/353 |
| 10,515,361 | B2 * | 12/2019 | Zarakas | G06Q 20/325 |
| 10,535,068 | B2 * | 1/2020 | Locke | H04W 4/80 |
| 10,541,995 | B1 * | 1/2020 | Mossler | H04L 63/0846 |
| 10,546,444 | B2 * | 1/2020 | Osborn | G07F 7/1008 |
| 10,581,611 | B1 * | 3/2020 | Osborn | G06Q 20/3829 |
| 10,664,830 | B1 * | 5/2020 | Rule | G06Q 20/3226 |
| 10,685,349 | B2 * | 6/2020 | Brickell | G06Q 20/327 |
| 10,797,882 | B2 * | 10/2020 | Rule | H04L 9/14 |
| 10,880,741 | B2 * | 12/2020 | Zarakas | G06Q 20/34 |
| 10,909,525 | B1 * | 2/2021 | Dhodapkar | G06Q 20/3278 |
| 10,970,691 | B2 * | 4/2021 | Koeppel | G06Q 20/3552 |
| 10,984,416 | B2 * | 4/2021 | Ilincic | G06Q 20/40 |
| 11,037,136 | B2 * | 6/2021 | Rule | G06Q 20/3278 |
| 11,062,098 | B1 * | 7/2021 | Bergeron | H04L 63/08 |
| 11,120,453 | B2 * | 9/2021 | Rule | H04L 63/0853 |
| 11,138,593 | B1 * | 10/2021 | Ho | G06Q 20/382 |
| 11,138,605 | B2 * | 10/2021 | Aabye | G06Q 20/401 |
| 11,176,540 | B2 * | 11/2021 | Gupta | G06Q 20/352 |
| 11,188,908 | B2 * | 11/2021 | Locke | G06Q 20/341 |
| 11,216,806 | B2 * | 1/2022 | Mossler | G06Q 20/4014 |

(56) References Cited

U.S. PATENT DOCUMENTS 11,297,958 B2 * 4/2022 Vukich ................ G06Q 20/352
11,334,872 B2 * 5/2022 Phillips ................ G06Q 20/352
11,361,173 B2 * 6/2022 Edwards .............. G06Q 20/352
11,392,933 B2 * 7/2022 Mossler ............. G06Q 20/3223
11,392,935 B2 * 7/2022 Suresh ................. G06Q 20/352
11,416,844 B1 * 8/2022 Osterkamp ........ G06Q 20/4015
11,423,392 B1 * 8/2022 Ho ....................... G06Q 20/409
11,443,292 B2 * 9/2022 Sherif .................. G06Q 20/204
11,444,770 B2 * 9/2022 Wieker ................... G06F 3/064
11,461,764 B2 * 10/2022 Rule .................. G06Q 20/3672
11,481,764 B2 * 10/2022 Shakkarwar ............. H04B 5/70
11,521,213 B2 * 12/2022 Rule ...................... G06K 7/082
11,551,200 B1 * 1/2023 Cook ................... G06Q 20/409
11,556,918 B2 * 1/2023 Mestre ............... G06Q 20/3226
11,615,395 B2 * 3/2023 McHugh ............ G06Q 20/3672
705/67
11,777,933 B2 * 10/2023 Moreton ................. G07F 7/084
12,182,798 B1 * 12/2024 Cook ....................... H04B 5/72
2001/0010723 A1 8/2001 Pinkas
2001/0029485 A1 10/2001 Brody et al.
2001/0034702 A1 10/2001 Mockett et al.
2001/0054003 A1 12/2001 Chien et al.
2002/0078345 A1 6/2002 Sandhu et al.
2002/0093530 A1 7/2002 Krothapalli et al.
2002/0100808 A1 8/2002 Norwood et al.
2002/0120583 A1 8/2002 Keresman, III et al.
2002/0152116 A1 10/2002 Yan et al.
2002/0153424 A1 10/2002 Li
2002/0165827 A1 11/2002 Gien et al.
2003/0023554 A1 1/2003 Yap et al.
2003/0034873 A1 2/2003 Chase et al.
2003/0055727 A1 3/2003 Walker et al.
2003/0078882 A1 4/2003 Sukeda et al.
2003/0167350 A1 9/2003 Davis et al.
2003/0208449 A1 11/2003 Diao
2003/0220876 A1 * 11/2003 Burger ............... G06K 19/0719
705/50
2004/0015958 A1 1/2004 Veil et al.
2004/0039919 A1 2/2004 Takayama et al.
2004/0127256 A1 7/2004 Goldthwaite et al.
2004/0215674 A1 10/2004 Odinak et al.
2004/0230799 A1 11/2004 Davis
2005/0044367 A1 2/2005 Gasparini et al.
2005/0075985 A1 4/2005 Cartmell
2005/0081038 A1 4/2005 Arditti Modiano et al.
2005/0138387 A1 6/2005 Lam et al.
2005/0156026 A1 7/2005 Ghosh et al.
2005/0160049 A1 7/2005 Lundholm
2005/0195975 A1 9/2005 Kawakita
2005/0228997 A1 * 10/2005 Bicker .................. H04L 63/062
713/171
2005/0247797 A1 11/2005 Ramachandran
2005/0269402 A1 * 12/2005 Spitzer ................. G06Q 20/385
235/449
2006/0006230 A1 1/2006 Bear et al.
2006/0016872 A1 * 1/2006 Bonalle ................ G06Q 20/341
235/382
2006/0040726 A1 2/2006 Szrek et al.
2006/0041402 A1 2/2006 Baker
2006/0044153 A1 3/2006 Dawidowsky
2006/0047954 A1 3/2006 Sachdeva et al.
2006/0085848 A1 4/2006 Aissi et al.
2006/0136334 A1 6/2006 Atkinson et al.
2006/0173985 A1 8/2006 Moore
2006/0174331 A1 8/2006 Schuetz
2006/0242698 A1 10/2006 Inskeep et al.
2006/0280338 A1 12/2006 Rabb
2007/0033642 A1 2/2007 Ganesan et al.
2007/0055630 A1 3/2007 Gauthier et al.
2007/0061266 A1 3/2007 Moore et al.
2007/0061487 A1 3/2007 Moore et al.
2007/0116292 A1 5/2007 Kurita et al.
2007/0118745 A1 5/2007 Buer
2007/0197261 A1 8/2007 Humbel
2007/0224969 A1 9/2007 Rao
2007/0241182 A1 10/2007 Buer
2007/0256134 A1 11/2007 Lehtonen et al.
2007/0258594 A1 11/2007 Sandhu et al.
2007/0276765 A1 * 11/2007 Hazel .................... G07F 19/206
705/71
2007/0278291 A1 12/2007 Rans et al.
2008/0008315 A1 1/2008 Fontana et al.
2008/0011831 A1 1/2008 Bonalle et al.
2008/0014867 A1 1/2008 Finn
2008/0035738 A1 2/2008 Mullen
2008/0071681 A1 3/2008 Khalid
2008/0072303 A1 3/2008 Syed
2008/0082452 A1 * 4/2008 Wankmueller ... G06Q 20/40145
705/72
2008/0086767 A1 4/2008 Kulkarni et al.
2008/0099552 A1 * 5/2008 Grillion ................. G06Q 40/02
235/380
2008/0103968 A1 5/2008 Bies et al.
2008/0109309 A1 5/2008 Landau et al.
2008/0110983 A1 5/2008 Ashfield
2008/0120711 A1 5/2008 Dispensa
2008/0156873 A1 7/2008 Wilhelm et al.
2008/0162312 A1 7/2008 Sklovsky et al.
2008/0164308 A1 7/2008 Aaron et al.
2008/0207307 A1 8/2008 Cunningham, II et al.
2008/0209543 A1 8/2008 Aaron
2008/0223918 A1 9/2008 Williams et al.
2008/0285746 A1 11/2008 Landrock et al.
2008/0308641 A1 12/2008 Finn
2009/0037275 A1 2/2009 Pollio
2009/0048026 A1 2/2009 French
2009/0132417 A1 5/2009 Scipioni et al.
2009/0143104 A1 6/2009 Loh et al.
2009/0171682 A1 7/2009 Dixon et al.
2009/0210308 A1 8/2009 Toomer et al.
2009/0235339 A1 9/2009 Mennes et al.
2009/0249077 A1 10/2009 Gargaro et al.
2009/0282264 A1 11/2009 Amiel et al.
2010/0023449 A1 1/2010 Skowronek et al.
2010/0023455 A1 1/2010 Dispensa et al.
2010/0029202 A1 2/2010 Jolivet et al.
2010/0033310 A1 2/2010 Narendra et al.
2010/0036769 A1 2/2010 Winters et al.
2010/0078471 A1 4/2010 Lin et al.
2010/0082491 A1 4/2010 Rosenblatt et al.
2010/0094754 A1 4/2010 Bertran et al.
2010/0095130 A1 4/2010 Bertran et al.
2010/0100480 A1 4/2010 Altman et al.
2010/0114731 A1 5/2010 Kingston et al.
2010/0192230 A1 7/2010 Steeves et al.
2010/0207742 A1 8/2010 Buhot et al.
2010/0211797 A1 8/2010 Westerveld et al.
2010/0240413 A1 9/2010 He et al.
2010/0257195 A1 * 10/2010 Inoue ..................... G06Q 30/02
707/769
2010/0257357 A1 10/2010 McClain
2010/0312634 A1 12/2010 Cervenka
2010/0312635 A1 12/2010 Cervenka
2011/0028160 A1 2/2011 Roeding et al.
2011/0035604 A1 2/2011 Habraken
2011/0060631 A1 3/2011 Grossman et al.
2011/0068170 A1 3/2011 Lehman
2011/0084132 A1 4/2011 Tofighbakhsh
2011/0101093 A1 5/2011 Ehrensvard
2011/0113245 A1 5/2011 Varadrajan
2011/0125638 A1 5/2011 Davis et al.
2011/0131415 A1 6/2011 Schneider
2011/0153437 A1 6/2011 Archer et al.
2011/0153496 A1 6/2011 Royyuru
2011/0155801 A1 * 6/2011 Rowberry .......... G06Q 20/3572
235/379
2011/0208658 A1 8/2011 Makhotin
2011/0208965 A1 8/2011 Machani
2011/0211219 A1 9/2011 Bradley
2011/0218911 A1 9/2011 Spodak
2011/0238564 A1 9/2011 Lim et al.
2011/0246780 A1 10/2011 Yeap et al.
2011/0258452 A1 10/2011 Coulier et al.

(56) References Cited

U.S. PATENT DOCUMENTS

2011/0280406 A1 11/2011 Ma et al.
2011/0282785 A1 11/2011 Chin
2011/0294418 A1 12/2011 Chen
2011/0312271 A1 12/2011 Ma et al.
2012/0024947 A1 2/2012 Naelon
2012/0030047 A1 2/2012 Fuentes et al.
2012/0030121 A1 2/2012 Grellier
2012/0047071 A1 2/2012 Mullen et al.
2012/0079281 A1 3/2012 Lowenstein et al.
2012/0109735 A1 5/2012 Krawczewicz et al.
2012/0109764 A1 5/2012 Martin et al.
2012/0143703 A1* 6/2012 Wall .................... G06Q 20/20 705/16
2012/0143754 A1 6/2012 Patel
2012/0150737 A1 6/2012 Rottink
2012/0178366 A1 7/2012 Levy et al.
2012/0196583 A1 8/2012 Kindo
2012/0207305 A1 8/2012 Gallo et al.
2012/0209773 A1 8/2012 Ranganathan
2012/0238206 A1 9/2012 Singh et al.
2012/0239560 A1 9/2012 Pourfallah et al.
2012/0252350 A1 10/2012 Steinmetz et al.
2012/0254394 A1 10/2012 Barras
2012/0284194 A1 11/2012 Liu et al.
2012/0290472 A1 11/2012 Mullen et al.
2012/0296818 A1 11/2012 Nuzzi et al.
2012/0316992 A1 12/2012 Oborne
2012/0317035 A1 12/2012 Royyuru et al.
2012/0317628 A1 12/2012 Yeager
2013/0005245 A1 1/2013 Royston
2013/0008956 A1 1/2013 Ashfield
2013/0026229 A1 1/2013 Jarman et al.
2013/0030997 A1* 1/2013 Spodak .............. G06Q 20/3572 705/41
2013/0048713 A1 2/2013 Pan
2013/0054474 A1 2/2013 Yeager
2013/0065564 A1 3/2013 Conner et al.
2013/0080228 A1 3/2013 Fisher
2013/0080229 A1 3/2013 Fisher
2013/0080239 A1 3/2013 Okerlund
2013/0099587 A1 4/2013 Lou
2013/0104251 A1 4/2013 Moore et al.
2013/0106576 A1 5/2013 Hinman et al.
2013/0119130 A1 5/2013 Braams
2013/0130614 A1 5/2013 Busch-Sorensen
2013/0144793 A1 6/2013 Royston
2013/0146657 A1* 6/2013 Graef .................... G07D 11/14 235/379
2013/0171929 A1 7/2013 Adams et al.
2013/0179351 A1 7/2013 Wallner
2013/0185772 A1 7/2013 Jaudon et al.
2013/0191279 A1 7/2013 Calman et al.
2013/0200999 A1 8/2013 Spodak et al.
2013/0211937 A1* 8/2013 Elbirt .................... G07F 7/0893 705/17
2013/0216108 A1 8/2013 Hwang et al.
2013/0226791 A1 8/2013 Springer et al.
2013/0226796 A1 8/2013 Jiang et al.
2013/0232082 A1 9/2013 Krawczewicz et al.
2013/0238894 A1 9/2013 Ferg et al.
2013/0282360 A1 10/2013 Shimota et al.
2013/0303085 A1 11/2013 Boucher et al.
2013/0304651 A1 11/2013 Smith
2013/0311363 A1* 11/2013 Ramaci ................ G07F 7/1008 705/41
2013/0312082 A1 11/2013 Izu et al.
2013/0314593 A1 11/2013 Reznik et al.
2013/0344857 A1 12/2013 Berionne et al.
2014/0002238 A1 1/2014 Taveau et al.
2014/0019352 A1 1/2014 Shrivastava
2014/0027506 A1 1/2014 Heo et al.
2014/0032409 A1 1/2014 Rosano
2014/0032410 A1 1/2014 Georgiev et al.
2014/0040120 A1 2/2014 Cho et al.
2014/0040139 A1 2/2014 Brudnicki et al.
2014/0040147 A1 2/2014 Varadarakan et al.
2014/0047235 A1 2/2014 Lessiak et al.
2014/0067690 A1 3/2014 Pitroda et al.
2014/0074637 A1 3/2014 Hammad
2014/0074655 A1 3/2014 Lim et al.
2014/0081720 A1 3/2014 Wu
2014/0081785 A1* 3/2014 Valadas Preto ...... G06Q 20/341 705/41
2014/0138435 A1 5/2014 Khalid
2014/0171034 A1 6/2014 Aleksin et al.
2014/0171039 A1 6/2014 Bjontegard
2014/0172700 A1 6/2014 Teuwen et al.
2014/0180851 A1 6/2014 Fisher
2014/0208112 A1 7/2014 McDonald et al.
2014/0214674 A1 7/2014 Narula
2014/0229375 A1 8/2014 Zaytzsev et al.
2014/0245391 A1 8/2014 Adenuga
2014/0256251 A1 9/2014 Caceres et al.
2014/0258099 A1 9/2014 Rosano
2014/0258113 A1 9/2014 Gauthier et al.
2014/0258125 A1 9/2014 Gerber et al.
2014/0274179 A1 9/2014 Zhu et al.
2014/0279420 A1* 9/2014 Okerlund ............. G06Q 20/387 705/39
2014/0279479 A1 9/2014 Maniar et al.
2014/0337235 A1 11/2014 Van Heerden et al.
2014/0339315 A1 11/2014 Ko
2014/0346860 A1 11/2014 Aubry et al.
2014/0365377 A1* 12/2014 Salama ................ G06Q 20/401 705/78
2014/0365780 A1 12/2014 Movassaghi
2014/0379361 A1 12/2014 Mahadkar et al.
2015/0012444 A1 1/2015 Brown et al.
2015/0032635 A1 1/2015 Guise
2015/0071486 A1 3/2015 Rhoads et al.
2015/0073983 A1* 3/2015 Bartenstein .......... G06Q 20/325 705/41
2015/0088757 A1 3/2015 Zhou et al.
2015/0089586 A1 3/2015 Ballesteros
2015/0097652 A1* 4/2015 Ishida ................. B60R 11/0264 340/5.61
2015/0113271 A1* 4/2015 Jooste ................. H04L 63/0435 713/168
2015/0127394 A1* 5/2015 Hogan ................... G06Q 10/02 705/5
2015/0134452 A1 5/2015 Williams
2015/0134513 A1* 5/2015 Olson .................. G06Q 20/352 235/492
2015/0140960 A1 5/2015 Powell et al.
2015/0154587 A1* 6/2015 Chetty .................. G06Q 20/20 705/16
2015/0154595 A1 6/2015 Collinge et al.
2015/0170138 A1 6/2015 Rao
2015/0178724 A1 6/2015 Ngo et al.
2015/0186871 A1 7/2015 Laracey
2015/0199673 A1* 7/2015 Savolainen ........ G06Q 20/4012 705/72
2015/0199863 A1* 7/2015 Scoggins ................. G07C 9/28 340/5.25
2015/0205379 A1 7/2015 Mag et al.
2015/0254637 A1* 9/2015 Yang ................ G06K 19/07732 235/375
2015/0302409 A1 10/2015 Malek
2015/0317295 A1* 11/2015 Sherry .................. G06F 40/117 715/226
2015/0317626 A1 11/2015 Ran et al.
2015/0332266 A1 11/2015 Friedlander et al.
2015/0339474 A1 11/2015 Paz et al.
2015/0363775 A1* 12/2015 Li .......................... H04L 9/321 705/71
2015/0371234 A1 12/2015 Huang et al.
2016/0012465 A1 1/2016 Sharp
2016/0026997 A1 1/2016 Tsui et al.
2016/0048913 A1 2/2016 Rausaria et al.
2016/0055480 A1 2/2016 Shah
2016/0057619 A1 2/2016 Lopez
2016/0065370 A1 3/2016 Le Saint et al.

(56) References Cited

U.S. PATENT DOCUMENTS

| | | | | |
|---|---|---|---|---|
| 2016/0078430 | A1* | 3/2016 | Douglas | G06Q 30/0185 705/43 |
| 2016/0087957 | A1 | 3/2016 | Shah et al. | |
| 2016/0092696 | A1 | 3/2016 | Guglani et al. | |
| 2016/0148193 | A1 | 5/2016 | Kelley et al. | |
| 2016/0189143 | A1* | 6/2016 | Koeppel | G06Q 20/327 705/41 |
| 2016/0232523 | A1 | 8/2016 | Venot et al. | |
| 2016/0239672 | A1 | 8/2016 | Khan et al. | |
| 2016/0253651 | A1 | 9/2016 | Park et al. | |
| 2016/0255072 | A1 | 9/2016 | Liu | |
| 2016/0267486 | A1 | 9/2016 | Mitra et al. | |
| 2016/0277383 | A1 | 9/2016 | Guyomarc'H et al. | |
| 2016/0277388 | A1 | 9/2016 | Lowe et al. | |
| 2016/0307187 | A1 | 10/2016 | Guo et al. | |
| 2016/0307189 | A1 | 10/2016 | Zarakas et al. | |
| 2016/0314472 | A1 | 10/2016 | Ashfield | |
| 2016/0330027 | A1 | 11/2016 | Ebrahimi | |
| 2016/0335531 | A1 | 11/2016 | Mullen et al. | |
| 2016/0345176 | A1* | 11/2016 | DeWitt | H04W 4/021 |
| 2016/0379217 | A1 | 12/2016 | Hammad | |
| 2017/0004502 | A1 | 1/2017 | Quentin et al. | |
| 2017/0011395 | A1 | 1/2017 | Pillai et al. | |
| 2017/0011406 | A1 | 1/2017 | Tunnell et al. | |
| 2017/0017957 | A1 | 1/2017 | Radu | |
| 2017/0017964 | A1 | 1/2017 | Janefalkar et al. | |
| 2017/0024716 | A1 | 1/2017 | Jiam et al. | |
| 2017/0039566 | A1 | 2/2017 | Schipperheijn | |
| 2017/0041759 | A1 | 2/2017 | Gantert et al. | |
| 2017/0068950 | A1 | 3/2017 | Kwon | |
| 2017/0103388 | A1 | 4/2017 | Pillai et al. | |
| 2017/0104739 | A1 | 4/2017 | Lansler et al. | |
| 2017/0109509 | A1 | 4/2017 | Baghdasaryan | |
| 2017/0109730 | A1 | 4/2017 | Locke et al. | |
| 2017/0116447 | A1 | 4/2017 | Cimino et al. | |
| 2017/0124568 | A1 | 5/2017 | Moghadam | |
| 2017/0140379 | A1 | 5/2017 | Deck | |
| 2017/0154328 | A1 | 6/2017 | Zarakas et al. | |
| 2017/0154333 | A1 | 6/2017 | Gleeson et al. | |
| 2017/0180134 | A1 | 6/2017 | King | |
| 2017/0230189 | A1 | 8/2017 | Toll et al. | |
| 2017/0237301 | A1 | 8/2017 | Elad et al. | |
| 2017/0289127 | A1 | 10/2017 | Hendrick | |
| 2017/0295013 | A1 | 10/2017 | Claes | |
| 2017/0316696 | A1 | 11/2017 | Bartel | |
| 2017/0317834 | A1 | 11/2017 | Smith et al. | |
| 2017/0330173 | A1 | 11/2017 | Woo et al. | |
| 2017/0374070 | A1 | 12/2017 | Shah et al. | |
| 2018/0034507 | A1 | 2/2018 | Wobak et al. | |
| 2018/0039986 | A1 | 2/2018 | Essebag et al. | |
| 2018/0039987 | A1* | 2/2018 | Molino | G06Q 20/4012 |
| 2018/0068316 | A1 | 3/2018 | Essebag et al. | |
| 2018/0129945 | A1 | 5/2018 | Saxena et al. | |
| 2018/0160255 | A1 | 6/2018 | Park | |
| 2018/0181958 | A1* | 6/2018 | Locke | G06Q 20/401 |
| 2018/0191501 | A1 | 7/2018 | Lindemann | |
| 2018/0205712 | A1 | 7/2018 | Versteeg et al. | |
| 2018/0240106 | A1 | 8/2018 | Garrett et al. | |
| 2018/0254909 | A1 | 9/2018 | Hancock | |
| 2018/0268132 | A1 | 9/2018 | Buer et al. | |
| 2018/0270214 | A1 | 9/2018 | Caterino et al. | |
| 2018/0294959 | A1 | 10/2018 | Traynor et al. | |
| 2018/0300716 | A1 | 10/2018 | Carlson | |
| 2018/0302396 | A1 | 10/2018 | Camenisch et al. | |
| 2018/0315050 | A1 | 11/2018 | Hammad | |
| 2018/0316666 | A1 | 11/2018 | Koved et al. | |
| 2018/0322486 | A1 | 11/2018 | Deliwala et al. | |
| 2018/0359100 | A1 | 12/2018 | Gaddam et al. | |
| 2019/0014107 | A1 | 1/2019 | George | |
| 2019/0019375 | A1 | 1/2019 | Foley | |
| 2019/0036678 | A1 | 1/2019 | Ahmed | |
| 2019/0172055 | A1* | 6/2019 | Hale | G06K 19/06187 |
| 2019/0238517 | A1 | 8/2019 | D'Agostino et al. | |
| 2019/0244188 | A1* | 8/2019 | Fisher | G06Q 20/00 |
| 2019/0303945 | A1* | 10/2019 | Mitra | G06Q 20/341 |
| 2020/0104891 | A1* | 4/2020 | Rule | G06Q 20/352 |
| 2021/0004800 | A1* | 1/2021 | Aggarwal | G06Q 20/405 |
| 2021/0004806 | A1* | 1/2021 | Noe | G06Q 20/3278 |
| 2021/0272098 | A1* | 9/2021 | Delsuc | H04L 63/0861 |
| 2021/0304189 | A1* | 9/2021 | Gupta | G06Q 20/4012 |
| 2021/0334723 | A1* | 10/2021 | Sakurada | G06Q 30/0645 |
| 2021/0383284 | A1 | 12/2021 | Bayer et al. | |
| 2021/0383360 | A1* | 12/2021 | Sinha | G06Q 20/405 |
| 2021/0406869 | A1* | 12/2021 | Pathrabe | H04L 9/0877 |
| 2021/0406908 | A1* | 12/2021 | Simonson | G06Q 20/42 |
| 2022/0060889 | A1* | 2/2022 | Bellenger | H04W 12/037 |
| 2022/0092709 | A1* | 3/2022 | Mimassi | G06F 21/32 |
| 2022/0114581 | A1* | 4/2022 | Upadhye | G06Q 20/382 |
| 2022/0138725 | A1 | 5/2022 | Sneider et al. | |
| 2022/0284416 | A1* | 9/2022 | Rule | G06Q 20/352 |
| 2022/0309509 | A1* | 9/2022 | Akgün | G06Q 20/3823 |
| 2022/0327518 | A1* | 10/2022 | Martin Perez | G06Q 20/352 |
| 2022/0335412 | A1* | 10/2022 | Rule | G06F 16/955 |
| 2022/0366396 | A1* | 11/2022 | Zhang | G06Q 20/3227 |
| 2022/0366410 | A1* | 11/2022 | Rule | G06Q 20/3267 |
| 2022/0398566 | A1* | 12/2022 | Rule | G06Q 20/405 |
| 2022/0414648 | A1* | 12/2022 | Rule | G06N 20/00 |
| 2023/0054157 | A1* | 2/2023 | Mao | H04B 5/20 |
| 2023/0065163 | A1* | 3/2023 | Vargas | G06Q 20/127 |
| 2023/0083785 | A1* | 3/2023 | Maiman | G07C 9/00309 340/5.65 |
| 2023/0169505 | A1* | 6/2023 | Rule | G06Q 20/42 705/64 |
| 2023/0354020 | A1* | 11/2023 | Rule | H04W 12/06 |
| 2023/0359839 | A1* | 11/2023 | Lövgren | G06K 7/10366 |
| 2024/0242199 | A1* | 7/2024 | Rapowitz | G06Q 20/352 |
| 2024/0243923 | A1* | 7/2024 | Oe | G06Q 10/02 |

FOREIGN PATENT DOCUMENTS

| | | | | |
|---|---|---|---|---|
| CN | 103023643 | | 4/2013 | |
| CN | 103417202 | | 12/2013 | |
| EP | 1 085 424 | | 3/2001 | |
| EP | 1 223 565 | | 7/2002 | |
| EP | 1 265 186 | | 12/2002 | |
| EP | 1 783 919 | | 5/2007 | |
| EP | 2 852 070 | | 1/2009 | |
| EP | 2 139 196 | | 12/2009 | |
| EP | 1 469 419 | | 2/2012 | |
| GB | 2 457 221 | | 8/2009 | |
| GB | 2 516 861 | | 2/2015 | |
| GB | 2 551 907 | | 1/2018 | |
| KR | 101508320 | | 4/2015 | |
| KR | 20150140132 | A | 12/2015 | |
| WO | 9910824 | A1 | 3/1999 | |
| WO | WO 00/49586 | | 8/2000 | |
| WO | WO 2006070189 | | 7/2006 | |
| WO | WO 2008055170 | | 5/2008 | |
| WO | WO 2009025605 | | 2/2009 | |
| WO | WO 2010049252 | | 5/2010 | |
| WO | WO 2011112158 | | 9/2011 | |
| WO | WO 2012001624 | | 1/2012 | |
| WO | WO 2013039395 | | 3/2013 | |
| WO | WO 2013155562 | | 10/2013 | |
| WO | WO 2013192358 | | 12/2013 | |
| WO | WO 2014043278 | | 3/2014 | |
| WO | WO 2014170741 | | 10/2014 | |
| WO | WO 2015179649 | | 11/2015 | |
| WO | WO 2015183818 | | 12/2015 | |
| WO | WO 2016097718 | | 6/2016 | |
| WO | WO 2016160816 | | 10/2016 | |
| WO | WO 2016168394 | | 10/2016 | |
| WO | 2017047855 | A1 | 3/2017 | |
| WO | WO 2017042375 | | 3/2017 | |
| WO | WO 2017042400 | | 3/2017 | |
| WO | WO 2017157859 | | 9/2017 | |
| WO | WO 2017208063 | | 12/2017 | |
| WO | WO 2018063809 | | 4/2018 | |
| WO | WO 2018137888 | | 8/2018 | |
| WO | WO-2018164486 | A1 * | 9/2018 | H04W 48/02 |
| WO | 2019022585 | A1 | 1/2019 | |
| WO | WO-2020072485 | A1 * | 4/2020 | H04W 12/06 |
| WO | 2021051884 | A1 | 3/2021 | |
| WO | 2021133492 | A1 | 7/2021 | |

(56) References Cited

FOREIGN PATENT DOCUMENTS

| | | | |
|---|---|---|---|
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Haykin M. and Warnar, R., "Smart Card Technology: New Methods for Computer Access Control," Computer Science and Technology NIST Special Publication 500-157:1-60 (1988).
Lehpamer, Harvey, "Component of the RFID System," RFID Design Principles, 2nd edition pp. 133-201 (2012).
Pourghomi, Pardis et al., "A Proposed NFC Payment Application," International Journal of Advanced Computer Science and Applications, vol. 4, No. 8 (2013).
Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared- : or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.I, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25,

(56) References Cited

OTHER PUBLICATIONS

2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, Mobicom. 10.1145/2348543.2348569.
EMVCo, EMV Card Personalization Specification, version 1.0 (Jun. 2003), 81 pages.
Ullmann et al., (2012). "On-Card User Authentication for Contactless Smart Cards based on Gesture Recognition", LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
The International Search Report and Written Opinion mailed Sep. 16, 2024 for related Int. App. No. PCT/US24/33571 (eight (8) pages).
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL:.
Smart Card Alliance, "Co-Branded Multi-Application Contactless Cards for Transit and Financial Payment," A Smart Card Alliance Transportation Council White Paper (40 pages), Mar. 2008.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.

* cited by examiner

Diagram 500

905 Prompt Check-In

910 Open Communication Field

915 Transmit Login Information

920 Validate User

925 Transmit Temporary Virtual Card Request

930 Receive Authentication Request

935 Transmit Authentication Credential

940 Receive Temporary Virtual Card

SYSTEMS AND METHODS FOR TRANSACTION PROCESSING BASED ON AUTHENTICATED IDENTITY

FIELD OF THE DISCLOSURE

The present disclosure relates to systems and methods for transaction processing based on the authenticated identity of a user.

BACKGROUND

Many transactions require the use of an identity of a consumer, including transactions for user-specific orders for goods or services. Any entity providing goods or services in response to user orders or other user-specific demands must handle the administrative functions of identifying a user when receiving, preparing, tracking, delivering, and collecting payment for an order. These administrative functions require the entity to expend time and resources. Further, the user may also be required to be engaged at various stages of this process.

For example, making reservations at a restaurant or other consumer establishment can be time consuming for the both the consumer and the establishment. The consumer must create an account with a mobile application or otherwise call the establishment to make a reservation. Meanwhile, the establishment must keep track of the reservation for when the customer checks in. But even after all that is done, the restaurant still requires the user to provide payment information at the end of the experience. This method is inefficient and insecure. For example, the restaurant could retrieve the identity and payment information in fewer steps. As another example, the restaurant may not confirm the customer's identity. Merely asking for a customer's name is usually most secure step taken to validate the reservation, which is quite low security.

Therefore, there is a need to provide systems and methods that overcome these deficiencies for both the consumer and the establishment.

SUMMARY OF THE DISCLOSURE

Embodiments of the present disclosure provide a system for dynamic reservation and payment, the system comprising a server configured to perform the following: The server can transmit, to a user device application, a login request and match, in response to receiving a user login information, the user login information to a user on file. Next, the server can transmit to the user device application upon matching the user login information to a user on file, a reservation confirmation message. Then, the server can transmit to the user device application a check-in request and match, upon receiving the user login information in response to the check-in request, the user login information to a reservation on file. The server can then transmit, to the user device application, a check-in confirmation message. The system further comprises a user device application comprising instructions for execution on a user device comprising a memory and a processor, the processor user device application configured to perform the following: The user device application can transmit, to a server, a reservation generation request and receive, from the server, a login request. Next, the application can open, in response to the login request, a first communication field and receive, from a card via the first communication field, a set of login information. Next, the card can transmit, to the server, the set of login information and receive, from the server in response to receiving the login information, a reservation confirmation message wherein the server has matched the user login information to a user on file. Next, the card can receive from the server after the reservation confirmation message has been received, a check-in request and open, in response to the check-in request, a second communication field. Then, the application can transmit to the server via the second communication field in response to the check-in request, the set of login information.

Embodiments of the present disclosure also provide a method. The method can begin by transmitting, from a user device application to a server, a reservation generation request and receiving, by the user device application from the server, a login request. Next, the method proceeds with opening, by the user device application in response to the reservation generation request, a first communication field and receiving, by the user device application from a card via the first communication field, a set of login information. Next, the method proceeds with transmitting, from the user device application to the server, the set of login information and receiving, from the server in response to receiving the login information, a reservation confirmation message wherein the server has matched the user login information to a user on file. Then, the method proceeds with receiving from the server after the reservation confirmation message has been received, a check-in request and transmitting, to the server in response to the check-in request, the set of login information. The method concludes with receiving, from the server, a check-in confirmation message wherein the server has transmitted the login information to the server and received, in response, a confirmation that the login information matches a reservation on file.

Embodiments of the present disclosure also provide a computer readable non-transitory medium comprising computer executable instructions that, when executed on a processor, perform the following steps: First, the processor can transmit a reservation generation request. Next, the processor can receive, in response to the reservation generation request, a login request and open, in response to the reservation generation request, a first communication field. The processor can receive from a card via the first communication field, a set of login information and transmit, to the server, the set of login information. Next, the processor can receive, from the server in response to receiving the login information, a reservation confirmation message wherein the server has matched the user login information to a user on file. Next, the processor can receive from an administrator processor after the reservation confirmation message has been received, a check-in request and open a second communication field. Next, the processor can transmit to the administrator processor in response to the check-in request, the set of login information and receive, from the administrator processor, a check-in confirmation message wherein the administrator processor has transmitted the login information to the server and received, in response, a confirmation that the login information matches a reservation on file. Next, the processor can transmit to the server after receiving the check-in confirmation message, a check-out request and receive, from the server in response to the check-out request, a payment request. Next, the processor can open, in response to the payment request, a third communication field. Having opened the second communication field, the processor can receive from the card a payment information. Next, the processor can transmit, to the server, the payment information and receive, from the server in response to validating the payment information, a check-out confirmation.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
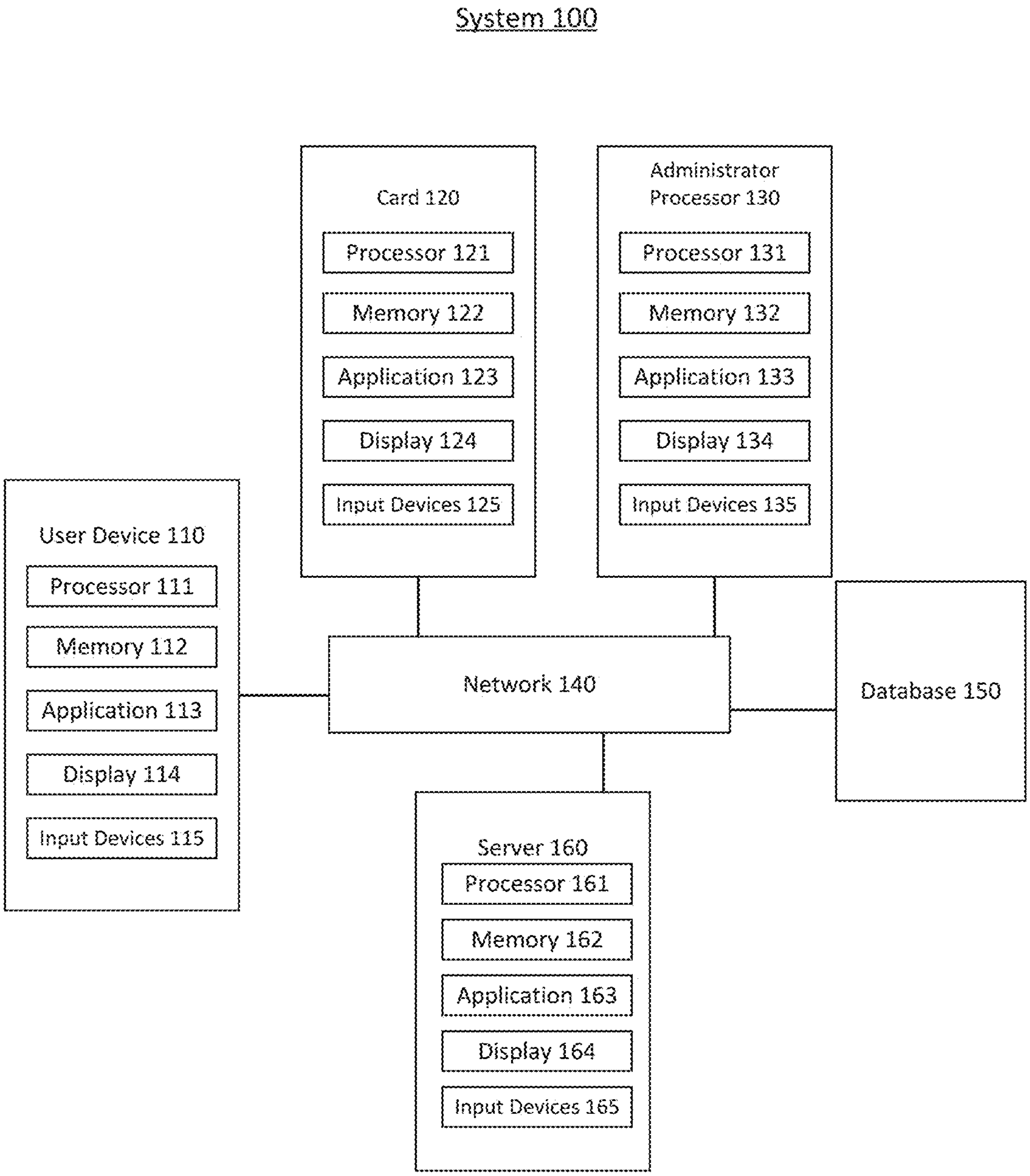
FIG. 1 is a block diagram illustrating a system according to an exemplary embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments. One skilled in the relevant art will recognize that the features and advantages of any embodiment may be interchangeably combined with the features and advantages of any other embodiment.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present embodiment describes a system and method for generating a reservation at a consumer establishment, checking in, and checking out through a contactless card. To complete the reservation, check-in, and checkout, the user need only tap their card to their user device application or to an administrator processor associated with the establishment. The card and the receiving device perform a diversified key exchange to quickly and securely validate the user's identity. Upon validating the user, the administrator processor or server can match the user with login information and payment information on file.

These systems and methods improve the efficiency and security of merchant technology, including the technology used by providers of goods and services to customers. Whereas conventional methods rely on checking in a customer by name only, the present system provides a more secure option of performing a key exchange to validate the user's identity. Additionally, the checkout processor is made easier and more secure by allowing the user to checkout by tapping their card to their user device application or the administrator processor.

FIG. 1 is a block diagram illustrating a system according to an exemplary embodiment. FIG. 1 illustrates a system 100 according to an example embodiment. The system 100 may comprise a user device 110, a card 120, an administrator processor 130, a network 140, a database 150, and a server 160. Although FIG. 1 illustrates single instances of components of system 100, system 100 may include any number of components.

System 100 may include a user device 110. The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, and an application 113. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

System 100 may include one or more contactless cards 120 which are further explained below with reference to FIG. 2 and FIG. 3. In some embodiments, contactless card 120 may be in wireless communication, utilizing NFC in an example, with user device 110. The card 120 can at least include a processor 121, memory 122, application 123, display 124, and input devices 125. The processor 121 may be a processor, a microprocessor, or other processor, and the card 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the card 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's private data and financial account information.

The application 123 may comprise one or more software applications. In some examples, the card 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The card 120 may further include a display 124 and input devices 125. The display 124 may be any type of device for presenting visual information such as a computer monitor and a flat panel display, The input devices 125 may include any device for entering information into the card 120 that is available and supported by the card 120, such as a touch-screen, keyboard, mouse, cursor-control device, touch-screen, microphone, digital camera, video recorder or camcorder. These devices may be used to enter information and interact with the software and other devices described herein.

System 100 may include an administrator processor 130. The administrator processor 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The administrator processor 130 may include a processor 131, a memory 132, and an application 133. The processor 131 may be a processor, a microprocessor, or other processor, and the administrator processor 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the administrator processor 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's private data and financial account information.

The application 133 may comprise one or more software applications, such as a mobile application and a web browser, comprising instructions for execution on the administrator processor 130. In some examples, the administrator processor 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. Such processes may be implemented in software, such as software modules, for execution by computers or other machines. The application 133 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The administrator processor 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the administrator processor 130 that is available and supported by the administrator processor 130, such as a touch-screen, keyboard, mouse, cursor-control device, touch-screen, microphone, digital camera, video recorder or camcorder. These devices may be used to enter information and interact with the software and other devices described herein.

System 100 may include one or more networks 140. In some examples, the network 140 may be one or more of a wireless network, a wired network or any combination of wireless network and wired network, and may be configured to connect the user device 110, the server 160, the database 150, the card 120, and the administrator processor 130. For example, the network 140 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 140 may include, without limitation, telephone lines, fiber optics, IEEE Ethernet 902.3, a wide area network, a wireless personal area network, a LAN, or a global network such as the Internet. In addition, the network 140 may support an Internet network, a wireless communication network, a cellular network, or the like, or any combination thereof. The network 140 may further include one network, or any number of the exemplary types of networks mentioned above, operating as a stand-alone network or in cooperation with each other. The network 140 may utilize one or more protocols of one or more network elements to which they are communicatively coupled. The network 140 may translate to or from other protocols to one or more protocols of network devices. Although the network 140 is depicted as a single network, it should be appreciated that according to one or more examples, the network 140 may comprise a plurality of interconnected networks, such as, for example, the Internet, a service provider's network, a cable television network, corporate networks, such as credit card association networks, and home networks. The network 140 may further comprise, or be configured to create, one or more front channels, which may be publicly accessible and through which communications may be observable, and one or more secured back channels, which may not be publicly accessible and through which communications may not be observable.

System 100 may include a database 150. The database 150 may be one or more databases configured to store data, including without limitation, private data of users, financial accounts of users, identities of users, transactions of users, and certified and uncertified documents. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 may be hosted internally by the server 160 or may be hosted externally of the server 160, such as by a server, by a cloud-based platform, or in any storage device that is in data communication with the server 160.

System 100 may include a server 160. The server 160 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 160 may include a processor 161, a memory 162, and an application 163. The processor 161 may be a processor, a microprocessor, or other processor, and the server 160 may include one or more of these processors. The processor 161 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 161 may be coupled to the memory 162. The memory 162 may be a read-only memory, write-once read-multiple memory or read/write memory, e.g., RAM, ROM, and EEPROM, and the server 160 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 162 may be configured to store one or more software applications, such as the application 163, and other data, such as user's private data and financial account information.

The application 163 may comprise one or more software applications comprising instructions for execution on the server 160. In some examples, the server 160 may execute one or more applications, such as software applications, that enable, for example, network communications with one or more components of the system 100, transmit and/or receive data, and perform the functions described herein. Upon execution by the processor 161, the application 163 may provide the functions described in this specification, specifically to execute and perform the steps and functions in the process flows described below. Such processes may be implemented in software, such as software modules, for execution by computers or other machines. The application 163 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 160 may further include a display 164 and input devices 165. The display 164 may be any type of device for presenting visual information such as a computer monitor, a flat panel display, and a mobile device screen, including liquid crystal displays, light-emitting diode displays, plasma panels, and cathode ray tube displays. The input devices 165 may include any device for entering information into the server 160 that is available and supported by the server 160, such as a touch-screen, keyboard, mouse, cursor-control device, touch-screen, microphone, digital camera, video recorder or camcorder. These devices may be used to enter information and interact with the software and other devices described herein.

Figure 2:
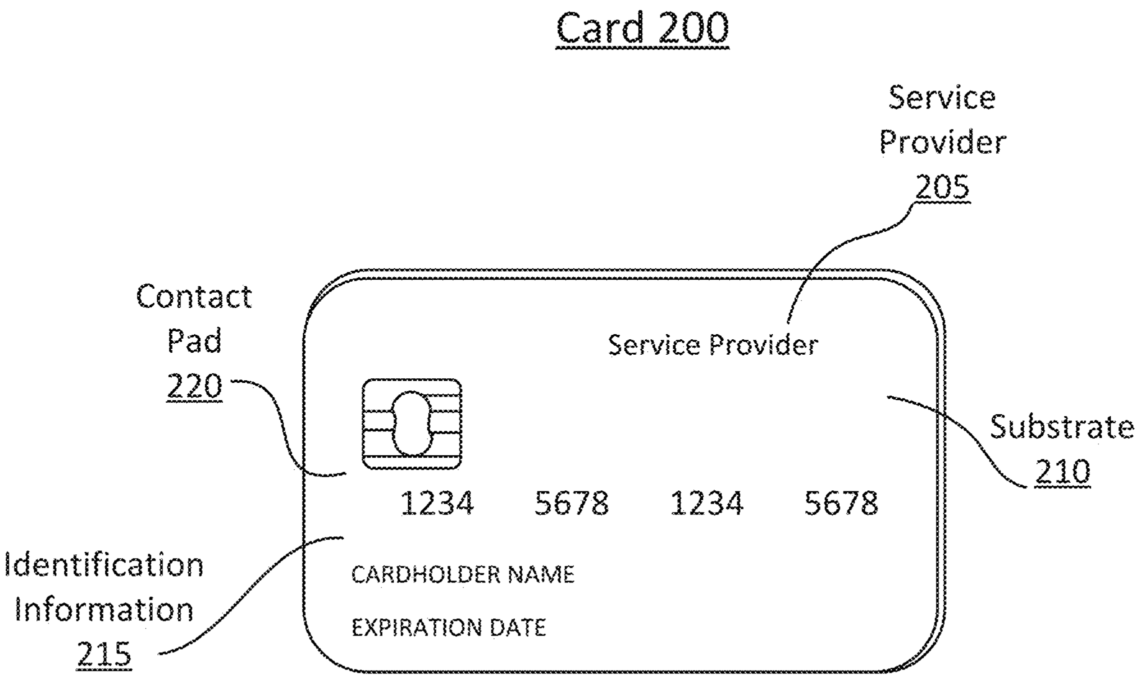
FIG. 2 is a diagram illustrating a card according to an exemplary embodiment.

FIG. 2 is a block diagram illustrating a card according to an exemplary embodiment.

The contactless card 200 may comprise a payment card, such as a credit card, debit card, or gift card, issued by a service provider 205 displayed on the front or back of the card 200. In some examples, the payment card may comprise a dual interface contactless payment card. In some examples, the contactless card 200 is not related to a payment card, and may comprise, without limitation, an identification card, a membership card, a loyalty card, a transportation card, and a point of access card.

The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, user device application, smart phone, laptop, desktop, or tablet computer. The contactless card 200 may also include processing circuitry, antenna and other components not shown in FIG. 2 and FIG. 3. These components may be located behind the contact pad 220 or elsewhere on the substrate 210. The contactless card 200 may also include a magnetic strip or tape, which may be located on the back of the card (not shown in FIG. 2).

Figure 3:
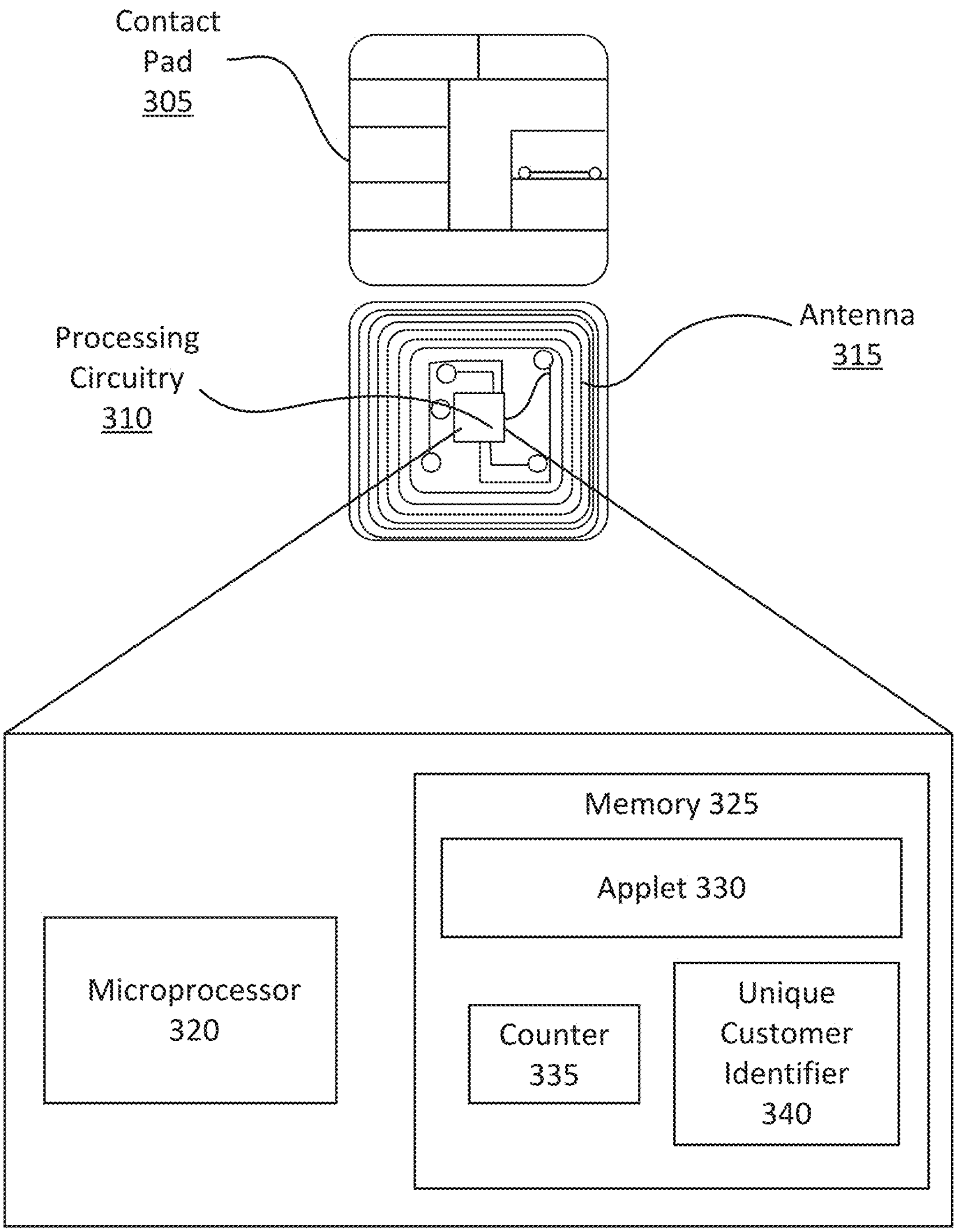
FIG. 3 is a diagram illustrating a contact pad of a card according to an exemplary embodiment.

FIG. 3 illustrates a contact pad 305 of a contactless card 200 according to an example embodiment. As illustrated in FIG. 3, the contact pad 305 may include processing circuitry 310 for storing and processing information, including a microprocessor 320 and a memory 325. It is understood that the processing circuitry 310 may contain additional components, including processors, memories, error and parity/CRC checkers, data encoders, anticollision algorithms, controllers, command decoders, security primitives and tamper-proofing hardware, as necessary to perform the functions described herein.

The memory 325 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 325 may be configured to store one or more applets 330, one or more counters 335, and a customer identifier 340. The one or more applets 330 may comprise one or more software applications configured to execute on one or more contactless cards, such as Java Card applet, and perform the functions described herein. However, it is understood that applets 330 are not limited to Java Card applets, and instead may be any software application operable on contactless cards or other devices having limited memory. The one or more counters 335 may comprise a numeric counter sufficient to store an integer. The customer identifier 340 may comprise a unique alphanumeric identifier assigned to a user of the contactless card 200, and the identifier may distinguish the user of the contactless card from other contactless card users. In some examples, the customer identifier 340 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 305 or entirely separate from it, or as further elements in addition to processor 320 and memory 325 elements located within the contact pad 305.

In some examples, the contactless card 200 may comprise one or more antennas 315. The one or more antennas 315 may be placed within the contactless card 200 and around the processing circuitry 310 of the contact pad 305. For example, the one or more antennas 315 may be integral with the processing circuitry 310 and the one or more antennas 315 may be used with an external booster coil. As another example, the one or more antennas 315 may be external to the contact pad 305 and the processing circuitry 310.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

As explained above, the contactless cards 200 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NFC Data Exchange Format (NDEF) message that comprises a cryptographically secure OTP encoded as an NDEF text tag.

Figure 4:
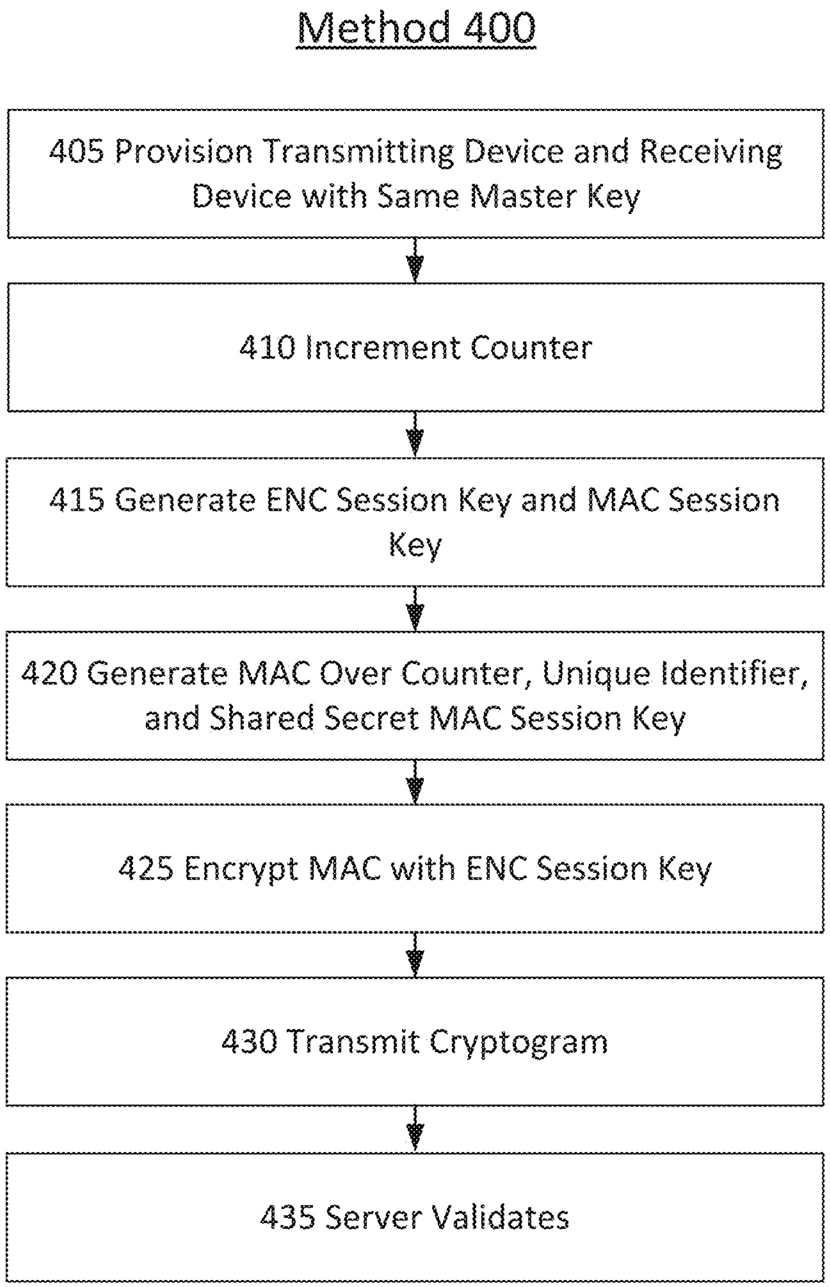
FIG. 4 is a flowchart illustrating a method according to an exemplary embodiment.

FIG. 4 is a flow chart of method 400 of key diversification according to an example of the present disclosure.

In some examples, a sender and recipient may desire to exchange data via a transmitting device and a receiving device. In some embodiments, the transmitting device is the contactless card and the receiving device is the server. It is understood that one or more transmitting devices and one or more receiving devices may be involved so long as each party shares the same shared secret symmetric key. In some examples, the transmitting device and receiving device may be provisioned with the same master symmetric key. In other examples, the transmitting device may be provisioned with a diversified key created using the master key. In some examples, the symmetric key may comprise the shared secret symmetric key which is kept secret from all parties other than the transmitting device and the receiving device involved in exchanging the secure data. It is further understood that part of the data exchanged between the transmitting device and receiving device comprises at least a portion of data which may be referred to as the counter value. The counter value may comprise a number that changes each time data is exchanged between the transmitting device and the receiving device.

The transmitting device and the receiving device may be configured to communicate via NFC, Bluetooth, RFID, Wi-Fi, and/or the like. The transmitting device and the receiving device may be network-enabled computer devices. In some examples, the transmitting device may comprise a contactless card and the receiving device may comprise a server. In other examples, the receiving device may comprise a user device or a user device application The method 400 can begin with step 405. In step 405, a transmitting device and receiving device may be provisioned with the same master key, such as the same master symmetric key. When the transmitting device is preparing to process the sensitive data with symmetric cryptographic operation, the transmitting device may update a counter. In addition, the transmitting device may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128, a symmetric HMAC algorithm, such as HMAC-SHA-256, and a symmetric CMAC algorithm, such as AES-CMAC.

In step 410, the transmitting device may take the selected cryptographic algorithm, and using the master symmetric key, process the counter value. For example, the transmitting device may select a symmetric encryption algorithm, and use a counter which updates with every conversation between the transmitting device and the receiving device. The one or more counters may comprise a numeric counter sufficient to store an integer. The transmitting device may increment the counter one or more times.

In step 415, the transmitting device generates two session keys: one ENC (encryption) session key and one MAC (message authentication code) session key. The transmitting device may encrypt the counter value with the selected symmetric encryption algorithm using the master symmetric key to create a session key.

In step 420, the transmitting device generates the MAC over the counter, the unique customer identifier, and the shared secret MAC session key. The customer identifier may comprise a unique alphanumeric identifier assigned to a user of the contactless card, and the identifier may distinguish the user of the contactless card from other contactless card users. In some examples, the customer identifier may identify both a customer and an account assigned to that customer and may further identify the contactless card associated with the customer's account.

In step 425, the transmitting device encrypts the MAC with the ENC session key. As encrypted, the MAC can become a cryptogram. In some examples, a cryptographic operation other than encryption may be performed, and a plurality of cryptographic operations may be performed using the diversified symmetric keys prior to transmittal of the protected data.

In some examples, the MAC cryptogram can be a digital signature used to verify user information. Other digital signature algorithms, such as public key asymmetric algorithms, e.g., the Digital Signature Algorithm and the RSA algorithm, or zero knowledge protocols, may be used to perform this verification.

In step 430, the transmitting device transmits a cryptogram to the receiving device. The cryptogram can include the applet information, the unique customer identifier, the counter value, and the encrypted MAC.

In step 435, the receiving device validates the cryptogram.

Figure 5:
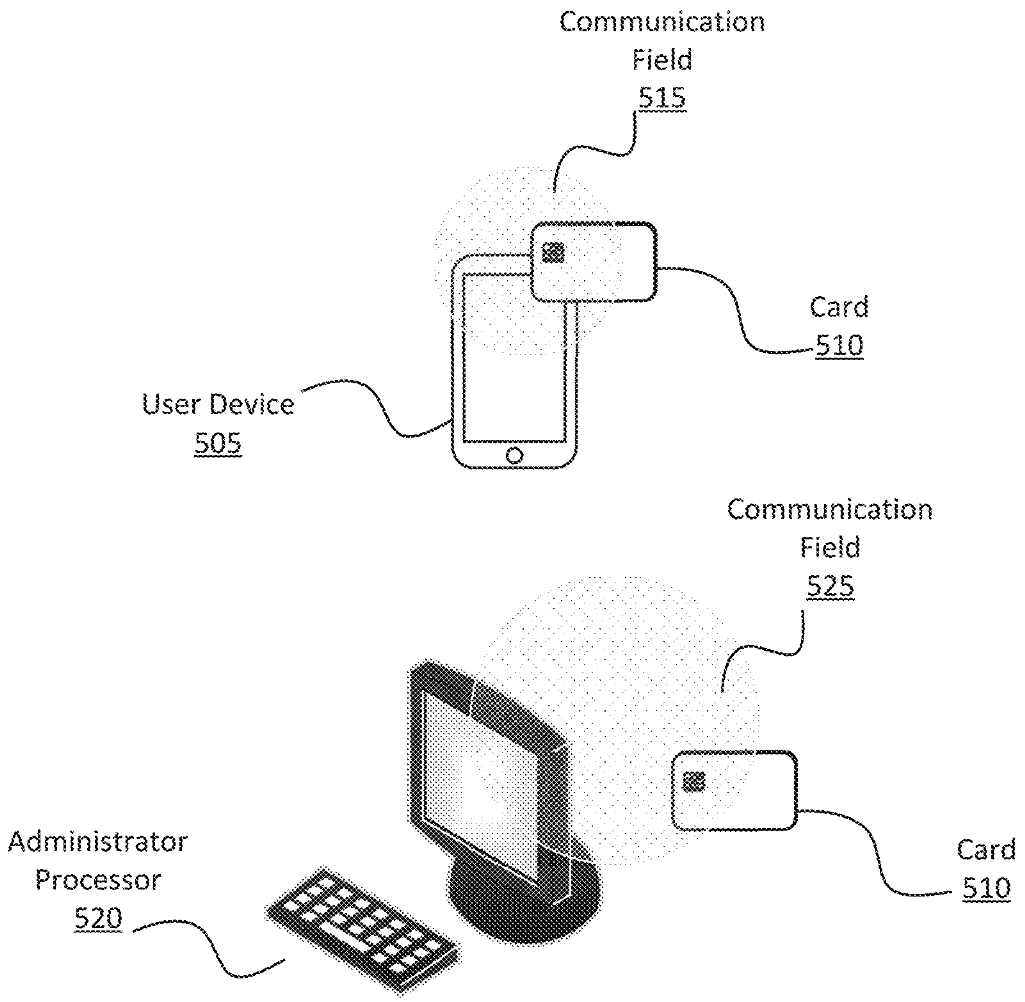
FIG. 5 is a diagram illustrating a process according to an exemplary embodiment.

FIG. 5 is a diagram illustrating near field communication (NFC) according to an exemplary embodiment.

Generally, NFC is the transmission of data through electromagnetic radio fields which enable two or more devices to communicate with each other without touching. NFC operates at 13.56 MHz on ISO/IEC 18000-3 air interface and at rates ranging from 106 kbit/s to 424 kbit/s. When two NFC-enabled devices are placed within a very small distances (e.g. a few centimeters), they can perform a transaction of information. NFC is beneficial to consumer transactions because it allows for near instantaneous reading of information. The receiving device reads the transmitted data the instant that it is sent. Therefore, human error is greatly reduced. Additionally, NFC reduces the time need to read a card. Rather than swipe a card through a reader, a consumer can simply touch the card or user device to an NFC enabled reader. Additionally, NFC reduces the risk of interference from fraudulent parties. Because NFC devices may communicate only over a very short distance, it is extremely difficult to intercept the information being sent between the devices.

Some examples of NFC communication include NFC card emulation where smartphones act like smart cards allowing users to perform transactions such as payment. As another example, NFC reader/writer communication allows devices to read information stored on NFC tags embedded into labels or smart posters. As another example, NFC peer-to-peer communication allows two NFC-enabled devices to communicate with each other to exchange information.

NFC standards cover communications protocols and data exchange formats, and are based on existing RFID standards including ISO/IEC 14443 and FeliCa. The standards include ISO/IEC 18092 and those defined by the NFC Forum.

In FIG. 5, a user device 505 and a contactless card 510 are interacting within an NFC field 515. The user device is further explained with reference to FIG. 1. The contactless card is further explained with reference to FIGS. 2 and 3. Both the user device and contactless card may be enabled with NFC technology. Though FIG. 5 depicts a smartphone, it is understood that the user device can include other computer-enabled device including without limitation a smart watch, a laptop or computer, or any other computer-enabled device discussed with further reference to FIG. 1. In other embodiments, a user device application can receive information from a card over an NFC field. The user device or user device application and the contactless card are in close contact with each other so that they can exchange information within the communication field. The exchange of information can include a diversified key exchange explained with further reference to FIG. 4. In addition, the exchange of information can include secure personal information including without limitation name, address, phone number, email, password, personal identification (PIN) number, unique customer identifier, or some other user datum. An NFC field can be opened between devices other than user devices. For example, a communication field 525 can be opened between an administrator processor 520 and a contactless card 510. The administrator processor can be associated with the consumer establishment. The contactless card is discussed with further reference to FIGS. 2 and 3. In other embodiments, a user device can also exchange information within the NFC field.

Figure 6:
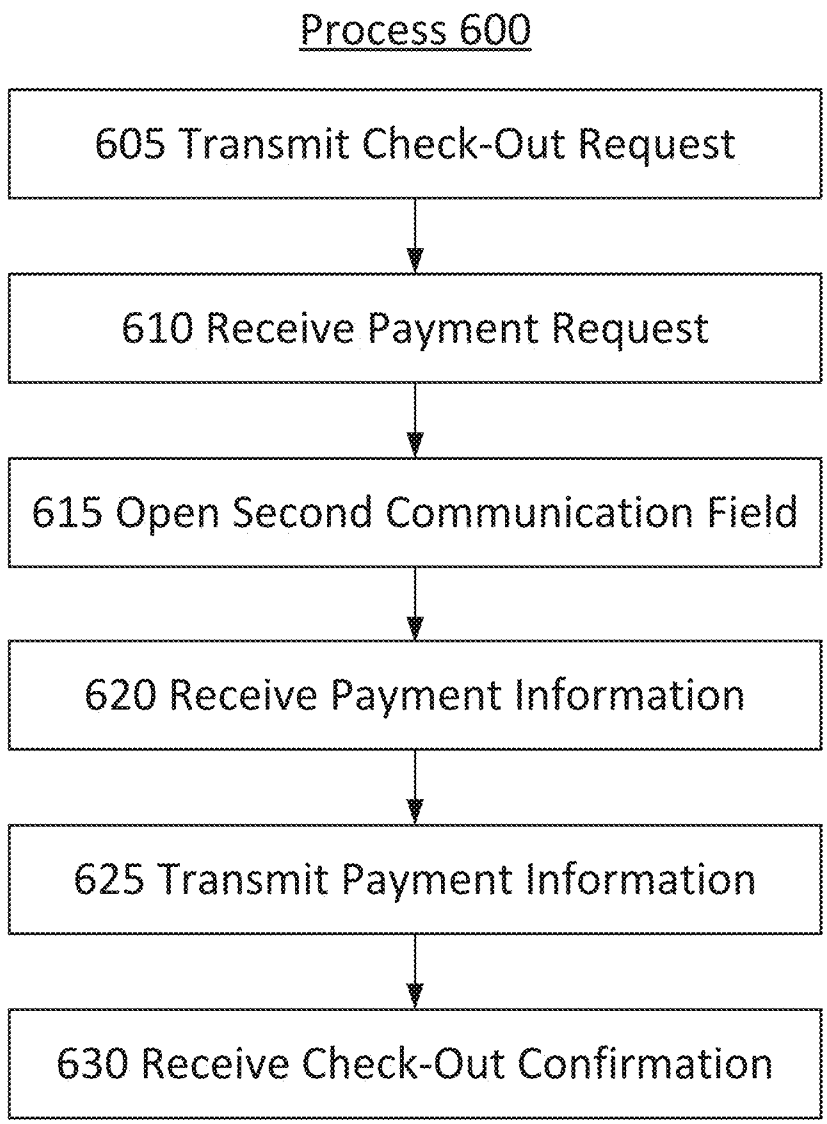
FIG. 6 is a flowchart illustrating a method according to an exemplary embodiment.

FIG. 6 is a flowchart illustrating a method according to an exemplary embodiment.

The process 600 describes a checkout process that can include, as a nonlimiting example, a contactless card, a user device, a user device application, an administrator processor, and/or a server. In action 605, a checkout request can be transmitted. The checkout request can be transmitted from a user device to an administrator processor or server. As another example, the request can be generated and transmitted over a mobile application or the user device application configured to communicate with the administrator processor and server. The user device application can be a software application including without limitation a mobile application, web application, desktop application, or other software application. In some embodiments, the user can interact with the user device application via a smart device including without limitation a smartphone, smart watch, or some other computer-enabled device discussed with further reference to FIG. 1. As another example, the checkout request can be transmitted from the contactless card to the user device, administrator processor, and/or server. The processor or server can be associated with a providers of goods and services, including but not limited to an experience or activity including but not limited to a drinking or dining experience, a theatrical production, a motion picture experience, a theme park, an art exhibition, a museum, a shopping experience, a housing tour, a transit experience such as a flight, bus trip, train trip, or boat trip, any purchase or rental of equipment, a beauty experience such as a haircut, massage, facial, pedicure, manicure, or any other consumer experience. As a nonlimiting example, a user can transmit a checkout request when their consumer-experience has concluded. As another nonlimiting example, the contactless card can transmit a checkout request when the consumer experience has ended. The contactless card can transmit the checkout request directly to the administrator processor or server via a communication field, card reader, or by some other method.

In action 610, the user device application can receive a payment request. The payment request can be received by the user device from the administrator processor or server. It is understood that the processor or server, upon receiving the checkout request from action 605, can match the checkout request with a user on file. The payment request can include a receipt or ledger of the goods and services given to the user or consumer. As another example, the payment request can be transmitted by the contactless card to the user device application.

Upon receiving the payment request, the user device application in action 615 can open a communication field. The communication field can include without limitation NFC, RFID, or Bluetooth. Communications fields are discussed with further reference to FIG. 5. This action can be performed by a processor associated with the user device. Once the communication field has opened, the user can move their contactless card within the field. The contactless card can be associated without limitation to a spending account, savings account, growth account, or some hybrid account.

In action 620, the user device application can receive payment information from the contactless card. The payment information can include card information linked to a credit or debit account. It is understood that other information can be shared from the contactless card to the user device application including without limitation a unique customer identifier, a MAC, or some other unique user datum. Alternatively, the contactless card and user device application can perform a diversified key exchange like that discussed with further reference to FIG. 4. Upon completing the diversified key exchange, the user device can retrieve the payment information from its own storage unit or by retrieving the payment information from a database, data storage unit, or server.

In other embodiments, the communication field can be opened instead by the administrator processor or server, in which case the contactless card can transmit payment information directly to the processor or server.

In action 625, the user device application can transmit the payment information to the administrator processor or server. This action can be performed by a processor associated with the user device. The payment information can be transmitted over a network. The payment information can be encrypted to protect the user's information. As another example, the contactless card can transmit the payment information directly to the administrator processor or server over a communication field, card reader, or by some other method.

In action 630, the user device application can receive a checkout confirmation message from the administrator processor or server. The processor or server can transmit the checkout confirmation upon receiving the payment information and confirming that the payment request has been satisfied. In other embodiments, the contactless card can receive the checkout confirmation form the administrator processor or server over a communication field, card reader, or by some other method. In the embodiments described herein, it is contemplated that reservations may be dynamically added, changed, or canceled via the user device application.

Figure 7:
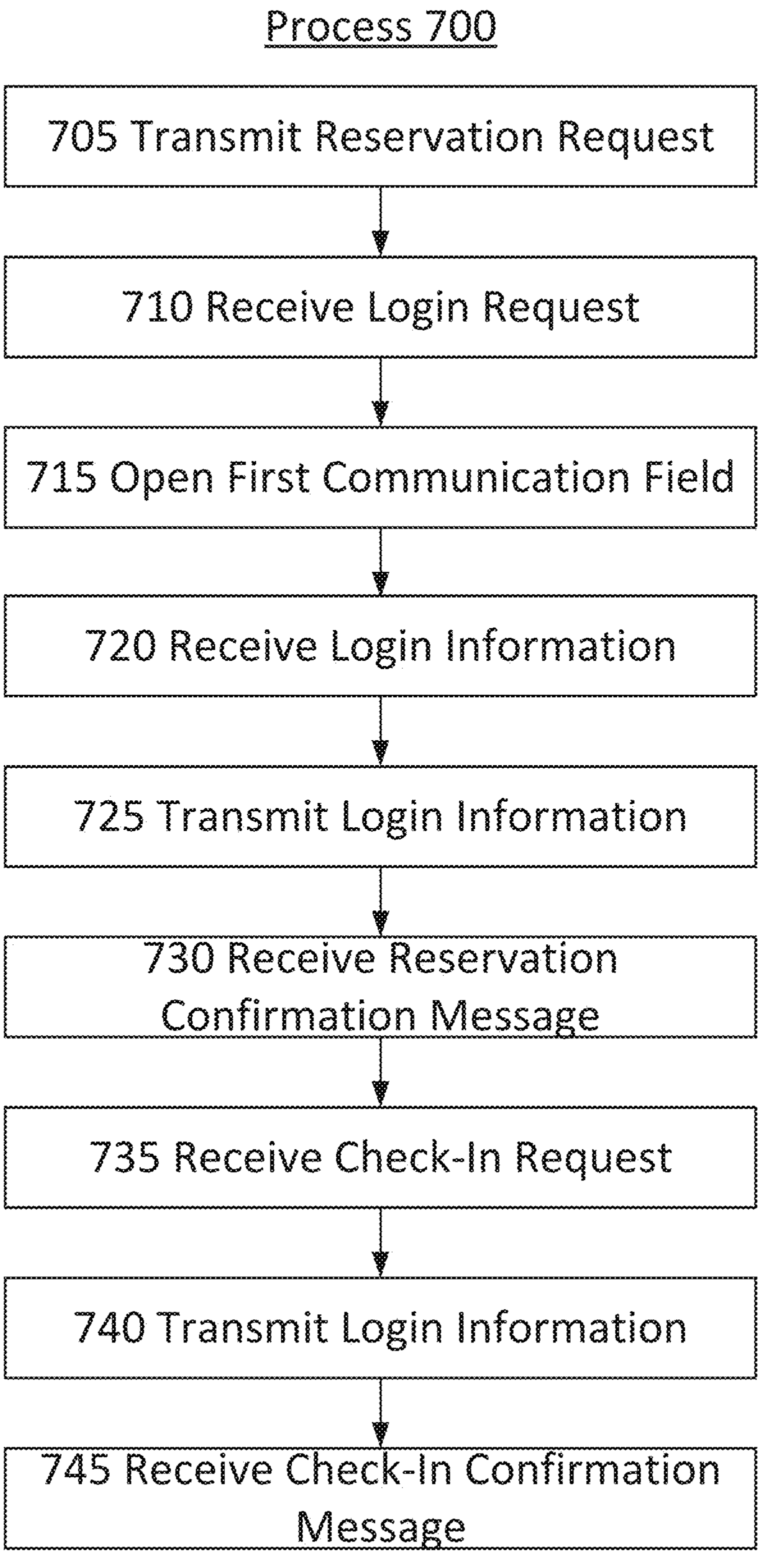
FIG. 7 is a flowchart illustrating a method according to an exemplary embodiment.

FIG. 7 is a flowchart illustrating a method according to an exemplary embodiment. The process 700 describes a checkout process that can include, as a nonlimiting example, a contactless card, a user device, a user device application, an administrator processor, and/or a server. In action 705, the user device application can transmit a reservation request. The user device application can be a software application including without limitation a mobile application, web application, desktop application, or other software application. In some embodiments, the user can interact with the user device application via a smart device including without limitation a smartphone, smart watch, or some other computer-enabled device discussed with further reference to FIG. 1. The request can be transmitted over a network to an administrator processor or server. The reservation request can be generated by a processor or the user device application itself. As another example, the contactless card can transmit the reservation request directly to the user device, user device application, administrator processor, or server via a communication field, card reader, network, or by some other method. The reservation request can include without limitation a request to reserve a time and location for an experience or activity including but not limited to a drinking or dining experience, a theatrical production, a motion picture experience, a theme park, an art exhibition, a museum, a shopping experience, a housing tour, a transit experience such as a flight, bus trip, train trip, or boat trip, any purchase or rental of equipment, and a beauty experience such as a haircut, massage, facial, pedicure, and manicure, or any other merchant. In action 710, the user device application can receive a login request. The login request can be generated by the administrator processor or server and transmitted over a network to the user device application. The login request can request without limitation a name, phone number, email address, payment information, reservation time, service request, food or drink request, or some other information related to the reservation. In other embodiments, the login request can be received by contactless card from the administrator processor or server over a communication field, card reader, network, or by some other method.

Upon receiving the login request, the user device application can open a first communication field in action 715. The communication field can be without limitation NFC, RFID, and Bluetooth. Communication fields are discussed with further reference to FIG. 5. In other embodiments, the communication field can be opened by the administrator processor or server. The contactless card can enter the communication field and transmit information to the user device application, administrator processor, or server in action 720. The information transmitted by the card to the user device application can be without limitation a unique user datum, MAC, card number, or some other secure information. Also, the contactless card can transmit some unique user datum sufficient to comprise login information. Alternatively, the contactless card and the user device application can perform a diversified key exchange discussed with further reference to FIG. 4. For example, the user device application can confirm through the diversified key exchange that the login information is being used by the correct user. Upon confirming the user's identity through the key exchange, the user device can retrieve the login information from a database, data storage unit, or server. For example, the user device application can hash a user datum received from the contactless card, transmit the hashed user datum to a server wherein the server can match the hashed user datum with a hashed user datum on file, and transmit the necessary login information back to the user device application.

Once the user device application receives the login information, in action 725 the device can transmit the login information to the administrator processor or server responsible for generating the reservation. The login information can be transmitted by a processor associated with the user device application over a network. In other embodiments, the contactless card can transmit the login information directly to the administrator process or server over a communication field, card reader, network, or by some other method. In action 730, the user device application can receive a reservation confirmation message. The message can be sent from the administrator processor or server upon confirming that the reservation is made. In other embodiments, the contactless card can receive the reservation confirmation message directly from the administrator processor or server over a communication field, card reader, network, or some other method.

Later, in action 735 a check-in request can be received by the server or administrator processor. The check-in request can be sent by the user device application over a network. Alternatively, the check-in request can be made by the user themselves when they arrive at the consumer establishment associated with the reservation. As another example, the contactless card can transmit the check-in request to the user device application, administrator processor, or server. Once the check-in request has been received, the administrator processor or server can request login information from the user. In action 740, the user can provide the login information by tapping the contactless card to the user device via a communication field or the administrator processor. In a nonlimiting example, the contactless card transmits the login information to the user device application via the user device over the communication field. In other embodiments, the contactless card can transmit the login information directly to the administrator processor or server via a communication field, card reader, network, or some other method. Upon receiving and validating the login information, the user device application in action 745 can receive check-in confirmation from the administrator processor or server. In the embodiments described herein, it is contemplated that reservations may be dynamically added, changed, or canceled via the user device application.

Figure 8:
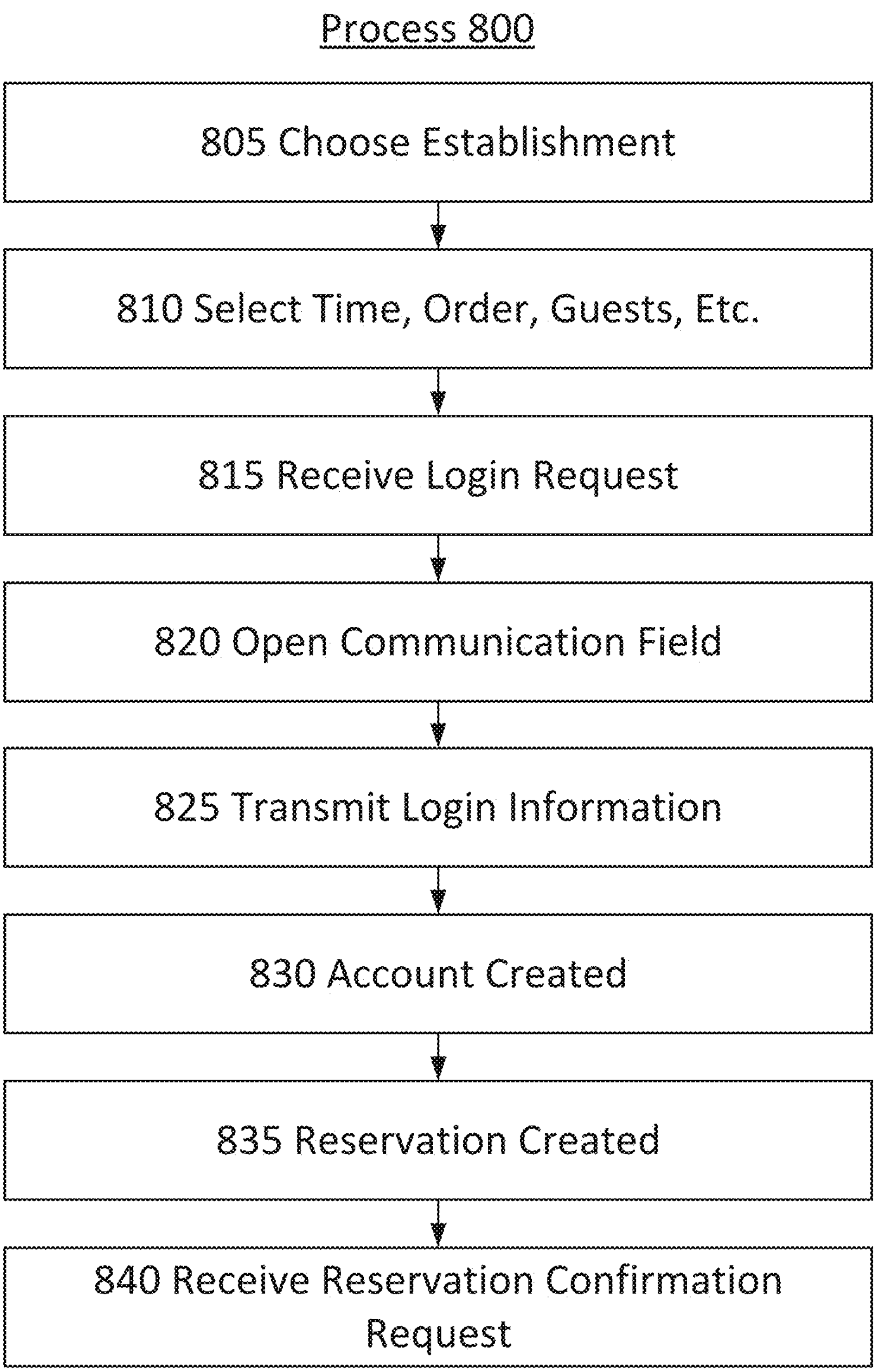
FIG. 8 is a flowchart illustrating a method according to an exemplary embodiment.

FIG. 8 is a flowchart illustrating a method for creating an account. In certain contexts, the user may want to make a reservation or other service request in connection with a consumer experience. The consumer experience can include without limitation a drinking or dining experience, a theatrical production, a motion picture experience, a theme park, an art exhibition, a museum, a shopping experience, a housing tour, a transit experience such as a flight, bus trip, train trip, or boat trip, any purchase or rental of equipment, and a beauty experience such as a haircut, massage, facial, pedicure, and manicure, or some other service, good, or experience provided by a merchant. But to make the reservation or service request, the user may be required to create an account. Rather than tediously enter the information necessary to create an account, the user can instead create an account with the tap of their contactless card.

In action 805, the user can select an establishment for which they want to make a reservation or service request. The selection can be made by a processor associated with a user device or a user device application. The user device application can be associated with the chosen establishment. The user device application can be a software application including without limitation a mobile application, web application, desktop application, or other software application. In some embodiments, the user can interact with the user device application via a smart device including without limitation a smartphone, smart watch, or some other computer-enabled device discussed with further reference to FIG. 1.

In action 810, the user can select other criteria that may be required of the reservation or service request, such as a time, location, order, guest number, duration, service, or other information related to the request. These criteria can be processed by the user device or user device application. Additionally, these criteria can be sent by the user device or user device application over a network to an administrator processor or server associated with the consumer establishment. In action 815, the user device application can receive a login request. The login request can be transmitted by the administrator processor or server associated with the chosen establishment in response to the criteria entered in actions 805 and 810. In action 820, the user device application can open a communication field and receive login information from the contactless card. In action 830, the user device application creates an account associated with the consumer establishment. The account can be created by the processor associated with the user device. As another example, the account can be generated by the user device application associated with the establishment. To create the account, the processor, user device application, or server can retrieve information necessary to create an account such as name, email, and phone number. This information can be retrieved from a database or data storage unit. This information can be hashed and validated by the server to preserve security. Having created the account, the administrator processor or server in action 835 can create the reservation. Once the reservation is created, the user device application in action 840 can receive a reservation validation request. In other embodiments, the contactless card can receive the reservation validation request directly from the administrator processor or server over a communication field, card reader, or some other method.

This method of account creation and reservation creation is quicker and more efficient that manually creatin an account through a mobile application. By tapping their card to the phone, the user can automatically retrieve login information and generate an account within a very short period of time. In the embodiments described herein, it is contemplated that reservations may be dynamically added, changed, or canceled via the user device application.

Figure 9:
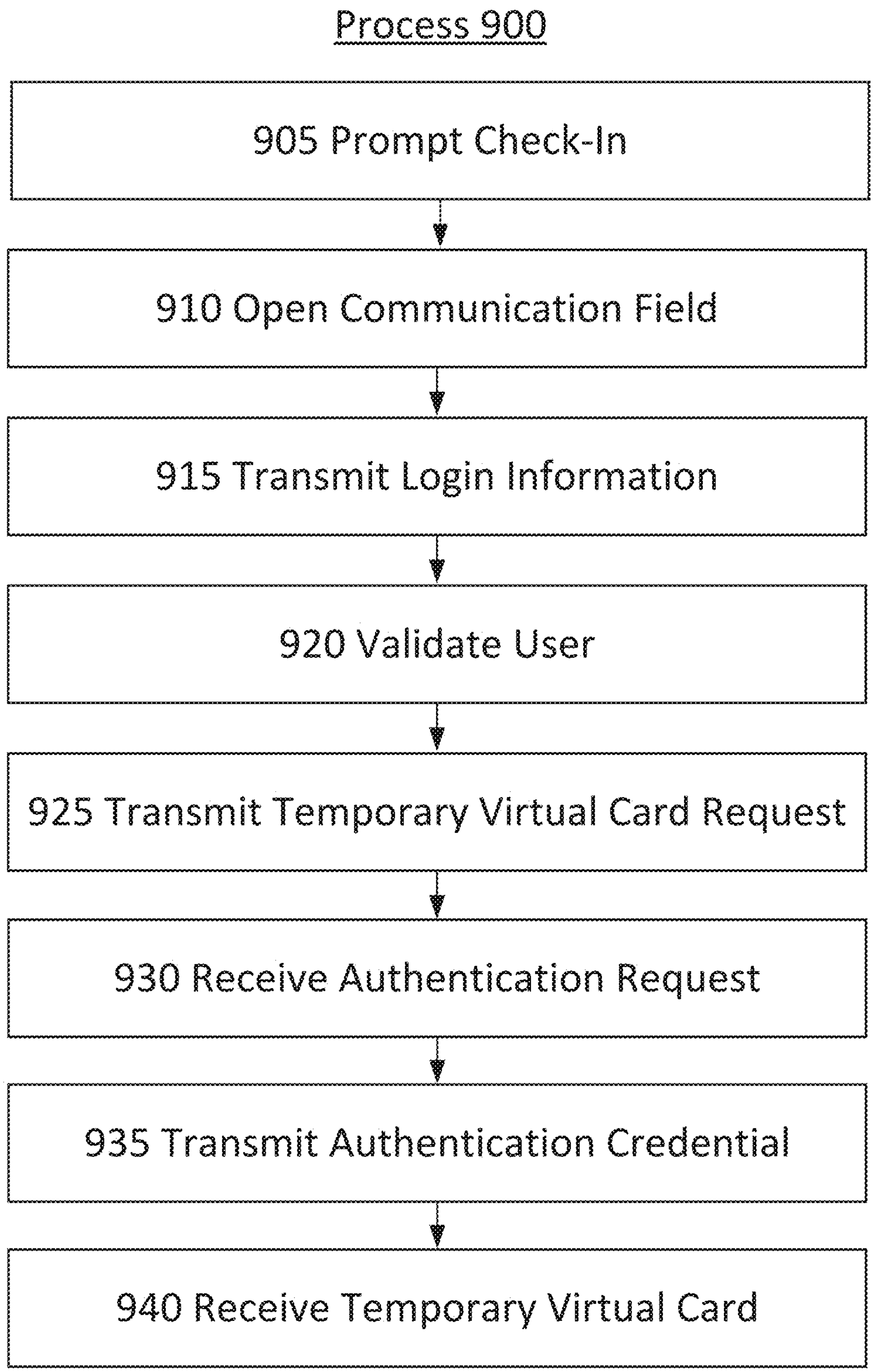
FIG. 9 is a flowchart illustrating a method according to an exemplary embodiment.

FIG. 9 is a flowchart illustrating a method for securely provision a temporary virtual payment card to a user. The method can include a user device, a user device application, an administrator processor, a server, and a card. In action 905, the user can prompt check-in at a consumer establishment. The prompt can be initiated by a request transmitted from a user device application over a network to the administrator application or server. Alternatively, the user can interact with the administrator processor through a display or some other interactive element such as a touch screen, mouse and keyboard, or voice command. For example, the card can prompt check-in by interacting with the user device, user device application, administrator processor, or server.

Upon prompting check-in, the user in action 910 can open a communication field between the user and the administrator processor or server. The communication field can include without limitation NFC, RFID, and Bluetooth. Communication fields are discussed further with reference to FIG. 5. Upon opening the communication field, the login information can be transmitted to the administrator processor or server in action 915. The login information can be the same login information used to create the reservation. The login information can be transmitted from the user device application. As another example, the contactless card can transmit the login information to the user device application, administrator processor or server. The user may place the contactless card in the communication field and transmit a unique user datum to the administrator processor or server. The unique user datum can include without limitation a digital signature or a unique customer identifier. For example, the digital signature can include a hash of the unique customer identifier or counter value associated with the contactless card, then encrypting the hash with the private key provisioned to the contactless card. The contactless card can transmit the digital signature to the user device application, then the user device application can decrypt the unique customer identifier or counter value using a public key to validate the digital signature. By validating the digital signature, the user device application can securely confirm the identity of the cardholder. As another nonlimiting example, the card and the administrator processor or server can perform a diversified key exchange including a MAC. The diversified key exchange is discussed with further reference to FIG. 4.

Once the server receives the unique user datum, the server can match the datum with a datum on file for the user. Having matched the user, the server or administrator processor can validate the user in action 920. Once the user has been validated, the user device or user device application can transmit a temporary virtual card request in action 925. Virtual payment cards are unique payment cards that allow users to complete transactions on their main payment card account associated with one or more of their financial accounts. In some examples, virtual payments cards can be limited to one-time use. In other examples, virtual payment cards can be limited to a predetermined number of uses and/or an unlimited number of uses over a predetermined time period.

The user device or user device application can receive an authentication request in action 930. The authentication request can be received over a wired or wireless network. In some embodiments, the authentication request can be received over a communication field including without limitation an NFC, Bluetooth, or RFID field. In response, the user device or user device application in action 935 can transmit an authentication credential over a wired or wireless network. In some embodiments, the authentication request can be received over a communication field including without limitation an NFC, Bluetooth, or RFID field. The credential can include without limitation a password, personal identification number (PIN), a message authentication code (MAC), a digital signature associated with the contactless card, a unique customer identifier associated with the card, a biometric, or some other secure user datum. In some embodiments, the authentication credential can be transmitted directly from the contactless card to the server to the user device application or server over a communication field such as NFC, Bluetooth, or RFID. After the administrator processor or server has validated the authentication credential, the user device or user device application can receive the temporary virtual card via a wired or wireless network. In some embodiments, the temporary virtual card can be received over a communication field including without limitation an NFC, Bluetooth, or RFID field.

It is understood that virtual payment cards can have other characteristics and features as described herein. The virtual payment card may be available on a third-party mobile application or web application. The virtual payment card may be sent via SMS or MMS messaging from an account processing system. The virtual card may contain the information present on a physical contactless card discussed in FIG. 2 and FIG. 3. The virtual payment card may expire after a certain amount of time, for example fifteen minutes. It is understood that the amount of time can be lengthened or shortened greatly.

The virtual payment card may expire if the user device leaves a predetermined geographical area. This predetermined area can be decided by the administrator processing system, the account processing system, or the users themselves. The geographical area can vary considerably. For example, the virtual card may be limited to a small area around a particular storefront. The virtual payment card may be limited by vendor to only one or more vendors. For example, a card may be limited to only one unique vendor in a unique location. Alternatively, the virtual card may be limited to vendors in a designated area such as a mall, market, or flea market. In another example, the virtual card may be limited to an entire franchise—that is, the card may be used at any store that is associated with a specific franchise. The virtual payment card may be limited by the amount of money available on the card. The card may be capped at a certain amount, for example $100. This amount can vary considerably. This amount can be determined by the user, the administrator processing system, or the account processing system. It is understood that a virtual payment card may combine these one or more limitations. Later, the virtual payment card can be used to perform a checkout at the conclusion of the user's reservation.

In the embodiments described herein, it is contemplated that reservations may be dynamically added, changed, or canceled via the user device application.

In some aspects, the techniques described herein relate to a system for dynamic reservation and payment, the system including: a server configured to: transmit, to a user device application, a login request; match, in response to receiving a user login information, the user login information to a user on file; transmit, to the user device application upon matching the user login information to a user on file, a reservation confirmation message; transmit, to the user device application a check-in request; match, upon receiving the user login information in response to the check-in request, the user login information to a reservation on file; transmit, to the user device application, a check-in confirmation message; and a user device application including instructions for execution on a user device including a memory and a processor, the user device application configured to: open, in response to the login request, a first communication field; receive, from a card via the first communication field, a set of login information; transmit, to the server, the set of login information; open, in response to the check-in request, a second communication field; and transmit, to the server via the second communication field in response to the check-in request, the set of login information.

In some aspects, the techniques described herein relate to a system, wherein the user device application is further configured to: transmit, to the server after receiving the check-in confirmation message, a check-out request; receive, from the server in response to the check-out request, a payment request; open, in response to the payment request, a third communication field; receive, from the card via the third communication field, a payment information; transmit, to the server, the payment information; and receive, from the server in response to validating the payment information, a check-out confirmation.

In some aspects, the techniques described herein relate to a system, wherein the set of login information includes at least an email address, a phone number, a user name, and a set of payment card information.

In some aspects, the techniques described herein relate to a system, wherein the one or more communication fields is near field communication (NFC), Bluetooth, or an RFID-enabled communication field.

In some aspects, the techniques described herein relate to a system, wherein the server is associated with a provider of goods and services.

In some aspects, the techniques described herein relate to a system, wherein the card is a contactless card associated with a spending account, a savings account, a growth account, or some hybrid account.

In some aspects, the techniques described herein relate to a system, wherein the system further includes an administrator processor configured to: transmit, to the user device application, a check-in request; receive login information; transmit the login information to the server; and receive, from the server, a confirmation that the login information matches a reservation on file.

In some aspects, the techniques described herein relate to a system, wherein the administrator processor is further configured to: receive, from the user device application, a request for a temporary virtual payment card; transmit, to the user device application, an authentication request; receive, from the user device application, an authentication credential; and transmit, to the user device application, a temporary virtual payment card.

In some aspects, the techniques described herein relate to a system, wherein the temporary virtual payment card is further configured to expire after a predetermined time period.

In some aspects, the techniques described herein relate to a system, wherein the temporary virtual payment card is further configured to be limited to a predetermined geographic location.

In some aspects, the techniques described herein relate to a system, wherein the temporary virtual payment card is further configured to be limited to a predetermined spending limit.

In some aspects, the techniques described herein relate to a method for dynamic reservation and payment, the method including: transmitting, from a user device application to a server, a reservation generation request; receiving, by the user device application from the server, a login request; opening, by the user device application in response to the reservation generation request, a first communication field; receiving, by the user device application from a card via the first communication field, a set of login information; transmitting, from the user device application to the server, the set of login information; receiving, from the server in response to receiving the login information, a reservation confirmation message wherein the server has matched the user login information to a user on file; receiving, from the server after the reservation confirmation message has been received, a check-in request; opening a second communication field; transmitting, to the server via the second communication field in response to the check-in request, the set of login information; and receiving, from the server, a check-in confirmation message wherein the server has matched the login information with a reservation on file.

In some aspects, the techniques described herein relate to a method, wherein the steps further include: transmitting, to the server after receiving the check-in confirmation message, a check-out request; receiving, from the server in response to the check-out request, a payment request; opening, in response to the payment request, a third communication field; receiving, from the card via the second communication field, a payment information; transmitting, to the server, the payment information; and receiving, from the server in response to validating the payment information, a check-out confirmation.

In some aspects, the techniques described herein relate to a method, wherein the reservation is associated with a provider of goods and services.

In some aspects, the techniques described herein relate to a method, wherein the method further includes: transmitting, by the user device application, the login information to a software application associated with the server.

In some aspects, the techniques described herein relate to a method, wherein the communication field is near field communication (NFC), Bluetooth, or an RFID-enabled communication field.

In some aspects, the techniques described herein relate to a method, wherein the method further includes: transmitting, by the user device application to the server, a request for a temporary virtual payment card; receiving, by the user device application from the server, an authentication request; transmitting, by the user device application to the server, an authentication credential; and receiving, by the user device application from the server, a temporary virtual payment card.

In some aspects, the techniques described herein relate to a method, wherein the authentication credential includes a digital signature associated with the card.

In some aspects, the techniques described herein relate to a method, wherein the authentication credential includes a unique customer identifier associated the card.

In some aspects, the techniques described herein relate to a computer readable non-transitory medium including computer executable instructions that, when executed on a processor, perform procedures including the steps of: transmitting, to a server, a reservation generation request; receiving, from the server in response to the reservation generation request, a login request; opening, in response to the reservation generation request, a first communication field; receiving, from a card via the first communication field, a set of login information; transmitting, to the server, the set of login information; receiving, from the server in response to receiving the set of login information, a reservation confirmation message wherein the server has matched the set of user login information to a user on file; receiving, from an administrator processor after the reservation confirmation message has been received, a check-in request; opening a second communication field; transmitting, to the administrator processor in response to the check-in request, the set of login information; receiving, from the administrator processor, a check-in confirmation message wherein the administrator processor has transmitted the login information to the server and received, in response, a confirmation that the login information matches a reservation on file; transmitting, to the server after receiving the check-in confirmation message, a check-out request; receiving, from the server in response to the check-out request, a payment request; opening, in response to the payment request, a third communication field; receiving, from the card via the second communication field, a payment information; transmitting, to the server, the payment information; and receiving, from the server in response to validating the payment information, a check-out confirmation.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

As used herein, user information, personal information, and sensitive information can include any information relating to the user, such as a private information and non-private information. Private information can include any sensitive data, including financial data (e.g., account information, account balances, account activity), personal information/personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons. Non-private information can include any data that is publicly known or otherwise not intended to be kept private.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

As used herein, the terms "card" and "contactless card" are not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, or membership cards), to cards associated with a particular type of account (e.g., a credit account, a debit account, a membership account), or to cards issued by a particular entity (e.g., a financial institution, a government entity, or a social club). Instead, it is understood that the present disclosure includes cards having any purpose, account association, or issuing entity.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

The preceding description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

We claim:

1. A system for dynamic reservation and payment, the system comprising:

a server configured to:

transmit, to a user device application, a login request;

match, in response to receiving encrypted authenticating information and a user login information, the encrypted authenticating information to a user on file, wherein the encrypted authenticating information includes a message authentication code (MAC) comprising a cryptogram generated by a card, wherein the encrypted authenticating information is matched by verifying the cryptogram;

transmit, to the user device application upon matching the encrypted authenticating information to the user on file, a reservation confirmation message confirming that a reservation has been generated with the user login information;

transmit, to the user device application a check-in request;

match, upon receiving the user login information in response to the check-in request, the user login information to a reservation on file; and transmit, to the user device application, a check-in confirmation message; and a user device application comprising instructions for execution on a user device comprising a memory and a processor, the user device application configured to:

open, in response to the login request, a first communication field;

receive, from the card via the first communication field, the encrypted authenticating information and the user login information for generating the reservation;

transmit, to the server, the encrypted authenticating information and the user login information;

open, in response to the check-in request, a second communication field; and transmit, to the server via the second communication field in response to the check-in request, the user login information.

2. The system of claim 1, wherein the user device application is further configured to:

transmit, to the server after receiving the check-in confirmation message, a check-out request;

receive, from the server in response to the check-out request, a payment request;

open, in response to the payment request, a third communication field;

receive, from the card via the third communication field, a payment information;

transmit, to the server, the payment information; and receive, from the server in response to validating the payment information, a check-out confirmation.

3. The system of claim 1, wherein the user login information comprises at least an email address, a phone number, a user name, and a set of payment card information.

4. The system of claim 1, wherein one or more of the first communication field and the second communication field is a near field communication (NFC), Bluetooth, or an RFID-enabled communication field.

5. The system of claim 1, wherein the server is associated with a provider of goods and services.

6. The system of claim 1, wherein the card is a contactless card associated with a spending account, a savings account, a growth account, or some hybrid account.

7. The system of claim 1, wherein the system further comprises an administrator processor configured to:

transmit, to the user device application, a check-in request;

receive login information;

transmit the login information to the server; and receive, from the server, a confirmation that the login information matches a reservation on file.

8. The system of claim 7, wherein the administrator processor is further configured to:

receive, from the user device application, a request for a temporary virtual payment card;

transmit, to the user device application, an authentication request;

receive, from the user device application, an authentication credential; and transmit, to the user device application, a temporary virtual payment card.

9. The system of claim 8, wherein the temporary virtual payment card is further configured to expire after a predetermined time period.

10. The system of claim 8, wherein the temporary virtual payment card is further configured to be limited to a predetermined geographic location.

11. The system of claim 8, wherein the temporary virtual payment card is further configured to be limited to a predetermined spending limit.

12. A method for dynamic reservation, the method comprising:

transmitting, from a user device application to a server, a reservation generation request;

receiving, by the user device application from the server, a login request;

opening, by the user device application in response to the reservation generation request, a first communication field;

receiving, by the user device application from a card via the first communication field, encrypted authenticating information and a set of login information for generating a reservation, wherein the encrypted authenticating information includes a message authentication code (MAC) comprising a cryptogram generated by the card;

transmitting, from the user device application to the server, the encrypted authenticating information and the set of login information;

receiving, from the server in response to receiving the set of login information, a reservation confirmation message confirming that the reservation has been generated with the set of login information wherein the server has matched the encrypted authenticating information to a user on file, wherein the encrypted authenticating information is matched by verifying the cryptogram;

receiving, from the server after the reservation confirmation message has been received, a check-in request;

opening a second communication field;

transmitting, to the server via the second communication field in response to the check-in request, the set of login information; and receiving, from the server, a check-in confirmation message wherein the server has matched the set of login information with a reservation on file.

13. The method of claim 12, further comprising:

transmitting, to the server after receiving the check-in confirmation message, a check-out request;

receiving, from the server in response to the check-out request, a payment request;

opening, in response to the payment request, a third communication field;

receiving, from the card via the second communication field, a payment information;

transmitting, to the server, the payment information; and receiving, from the server in response to validating the payment information, a check-out confirmation.

14. The method of claim 12, wherein the reservation is associated with a provider of goods and services.

15. The method of claim 12, wherein the first communication field, the second communication field, or both are a near field communication (NFC), Bluetooth, or an RFID-enabled communication field.

16. The method of claim 12, wherein the method further comprises:

transmitting, by the user device application to the server, a request for a temporary virtual payment card;

receiving, by the user device application from the server, an authentication request;

transmitting, by the user device application to the server, an authentication credential; and receiving, by the user device application from the server, a temporary virtual payment card.

17. The method of claim 12, wherein the method further comprises:

hashing, by the user device application, at least a portion of the set of login information received from the card; and transmitting, by the user device application, the hashed set of login information to the server.

18. The method of claim 12, wherein the method further comprises:

receiving, by the user device application prior to receiving the login request, a selection of an establishment; and creating, by the user device application after receiving the set of login information responsive to the reservation generation request, an account with the establishment based on the received set of login information.

19. A computer readable non-transitory medium comprising computer executable instructions that, when executed on a processor, perform procedures comprising the steps of:

transmitting, to a server, a reservation generation request;

receiving, from the server in response to the reservation generation request, a login request;

opening, in response to the reservation generation request, a first communication field;

receiving, from a card via the first communication field, encrypted authenticating information and a set of login information for generating a reservation, wherein the encrypted authenticating information includes a message authentication code (MAC) comprising a cryptogram generated by a card;

transmitting, to the server, the encrypted authenticating information and the set of login information;

receiving, from the server in response to receiving the set of login information, a reservation confirmation message confirming that the reservation has been generated with the set of user login information wherein the server has matched the encrypted authenticating information to a user on file by verifying the cryptogram;

receiving, from an administrator processor after the reservation confirmation message has been received, a check-in request;

opening a second communication field;

transmitting, to the administrator processor in response to the check-in request, the set of login information; and receiving, from the administrator processor, a check-in confirmation message, wherein the administrator processor has transmitted the set of login information to the server and received, in response, a confirmation that the set of login information matches a reservation on file.

* * * * *